(12) United States Patent  
Chang et al.

(10) Patent No.: US 12,269,947 B2  
(45) Date of Patent: *Apr. 8, 2025

(54) MULTI-LAYERED STRUCTURES AND USES THEREOF

(71) Applicant: NIKE, Inc., Beaverton, OR (US)

(72) Inventors: Yihua Chang, Portland, OR (US); Richard L. Watkins, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/312,171

(22) Filed: May 4, 2023

(65) Prior Publication Data

US 2023/0272215 A1    Aug. 31, 2023

Related U.S. Application Data

(63) Continuation of application No. 16/534,261, filed on Aug. 7, 2019, now abandoned.

(60) Provisional application No. 62/730,651, filed on Sep. 13, 2018.

(51) Int. Cl.
| | |
|---|---|
| *C08L 75/14* | (2006.01) |
| *B32B 25/04* | (2006.01) |
| *B60C 1/00* | (2006.01) |
| *C08L 21/00* | (2006.01) |

(52) U.S. Cl.
CPC ............ *C08L 75/14* (2013.01); *B32B 25/042* (2013.01); *B60C 1/00* (2013.01); *C08L 21/00* (2013.01); *B32B 2307/7242* (2013.01); *B32B 2605/00* (2013.01); *B60C 2001/0083* (2013.01)

(58) Field of Classification Search
CPC . B32B 25/042; B60C 1/00; B60C 2001/0083; C08L 75/14; C08L 21/00
See application file for complete search history.

(56) References Cited

U.S. PATENT DOCUMENTS

| | | |
|---|---|---|
| 3,427,366 A | 2/1969 | Verdol et al. |
| 3,827,204 A | 8/1974 | Walters |
| 5,094,793 A | 3/1992 | Schrenk et al. |
| 5,269,995 A | 12/1993 | Ramanathan et al. |
| 5,670,102 A | 9/1997 | Perman et al. |
| 5,938,869 A | 8/1999 | Kaido et al. |
| 6,082,025 A | 7/2000 | Bonk et al. |
| 6,218,024 B1 | 4/2001 | Tamber et al. |
| 6,730,379 B2 | 5/2004 | Bonk et al. |
| 8,101,671 B2 | 1/2012 | Kanae et al. |
| 8,801,884 B2 | 8/2014 | Hashimura et al. |

(Continued)

FOREIGN PATENT DOCUMENTS

| | | |
|---|---|---|
| CN | 1178812 A | 4/1998 |
| CN | 101563398 A | 10/2009 |

(Continued)

OTHER PUBLICATIONS

International Preliminary Report on Patentability for PCT/2017/039087 mailed Jul. 30, 2018.

(Continued)

*Primary Examiner* — Michael P Wieczorek  
(74) *Attorney, Agent, or Firm* — SHOOK, HARDY & BACON L.L.P.

(57) ABSTRACT

Multi-layered structures and methods for producing them are disclosed.

19 Claims, 3 Drawing Sheets

(56) References Cited

U.S. PATENT DOCUMENTS

| | | | |
|---|---|---|---|
| 10,377,112 B2 | 8/2019 | Chang et al. | |
| 11,903,440 B2* | 2/2024 | Bandyopadhyay | C08L 21/00 |
| 2002/0045040 A1 | 4/2002 | Kanada et al. | |
| 2003/0225201 A1 | 12/2003 | Yamana et al. | |
| 2003/0235670 A1 | 12/2003 | Shepard et al. | |
| 2005/0031816 A1 | 2/2005 | Chang et al. | |
| 2006/0237122 A1 | 10/2006 | Dhawan et al. | |
| 2007/0105971 A1 | 5/2007 | Schaller et al. | |
| 2007/0141282 A1 | 6/2007 | Chang et al. | |
| 2008/0004563 A1 | 1/2008 | Lemay et al. | |
| 2008/0027176 A1 | 1/2008 | Nishioka et al. | |
| 2008/0045643 A1 | 2/2008 | Henning et al. | |
| 2009/0209670 A1 | 8/2009 | Kanae et al. | |
| 2010/0071823 A1 | 3/2010 | Tomoi | |
| 2012/0237742 A1 | 9/2012 | Tai et al. | |
| 2013/0109799 A1 | 5/2013 | Weber | |
| 2013/0186539 A1 | 7/2013 | Takahashi et al. | |
| 2014/0007647 A1 | 1/2014 | Mannal et al. | |
| 2014/0039080 A1 | 2/2014 | Amamoto et al. | |
| 2014/0076474 A1 | 3/2014 | Amamoto et al. | |
| 2014/0096882 A1 | 4/2014 | Kitano et al. | |
| 2014/0099490 A1 | 4/2014 | Kitano et al. | |
| 2014/0124114 A1 | 5/2014 | Hayashi et al. | |
| 2014/0316023 A1 | 10/2014 | Amamoto et al. | |
| 2014/0326376 A1 | 11/2014 | Amamoto et al. | |
| 2015/0125685 A1 | 5/2015 | Kitano et al. | |
| 2016/0075113 A1* | 3/2016 | Chang | B32B 27/08 156/244.11 |
| 2017/0251751 A1 | 9/2017 | Baghdadi et al. | |
| 2019/0127618 A1 | 5/2019 | Kuramochi et al. | |
| 2020/0087512 A1 | 3/2020 | Chang et al. | |
| 2021/0085023 A1 | 3/2021 | Bandyopadhyay et al. | |

FOREIGN PATENT DOCUMENTS

| | | |
|---|---|---|
| CN | 102223816 A | 10/2011 |
| CN | 103038299 A | 4/2013 |
| CN | 103118871 A | 5/2013 |
| CN | 104441853 A | 3/2015 |
| DE | 102009009589 A1 | 9/2010 |
| JP | 2002210872 A | 7/2002 |
| JP | 2013-14724 A2 | 1/2013 |
| TW | I256961 B | 6/2006 |
| WO | 2005017024 A2 | 2/2005 |
| WO | 2005023036 A2 | 3/2005 |
| WO | 2007025690 A1 | 3/2007 |
| WO | 2009017868 A1 | 2/2009 |
| WO | 2012112483 A1 | 8/2012 |
| WO | 2012165441 A1 | 12/2012 |
| WO | 2013013784 A1 | 1/2013 |
| WO | 2013074338 A1 | 5/2013 |
| WO | 2013168676 A1 | 11/2013 |
| WO | 2016040893 A1 | 3/2016 |
| WO | 2017187968 A1 | 11/2017 |
| WO | 2018187249 A1 | 10/2018 |
| WO | 2019079692 A1 | 4/2019 |
| WO | 2019079715 A1 | 4/2019 |
| WO | 2019079720 A1 | 4/2019 |

OTHER PUBLICATIONS

International Preliminary Report on Patentability for PCT/US2015/049827 mailed Dec. 20, 2016.
Harris, C.M., et al.; Harris' Shock and Vibration Handbook, 2002, Chapter 33, pp. 33.1-33.18.
Miller-Chou et al., A Review of Polymer Dissolution, Prog. Polym. Sci. 28, 2003, pp. 1223-1270.
Cray Valley Application Bulletin, entitled "Novel Polybutadiene Diols for Thermoplastic Polyurethanes", 2010.
Ovejero et al., Solubility and Flory Huggins Parameters of SVES, poly(styrene-b-butene/ethylene-b-styrene) triblock copolymer, determined by intrinsic visocity, European Polymer Journal 43, 2007, pp. 1444-1449.
International Search Report and Written Opinion from PCT/US2017/039087 mailed Sep. 29, 2017.
International Preliminary Report on Patentability for PCT/US2019/045500 mailed on Jun. 23, 2020.
Hoven, Vipavee P.; et al., "Reduction of Offensive Odor from Natural Rubber by Odor-Reducing Substances", Mar. 9, 2004, Journal of Applied Polymer Science, vol. 92, p. 2253 (Year: 2004).
International Search Report and Written Opinion from PCT/US2019/045500 mailed Nov. 15, 2019.
Corrosionpedia, "Curing Agent", Dec. 28, 2015, p. 1 (Year: 2015).
Kasner, et al., "Porosity in Rubber, a Review", Department of Polymer Science, The University of Akron, PSCI 425, Akron, OH, vol. 69, Oct. 1995, pp. 429, 436, and 439-440.
Rameshwar Adhikari, "Correlations Between Molecular Architecture, Morphology and Deformation Behaviour of Styrene/Butadiene Block Copolymers and Blends", (Nov. 2011), 162 pages.
Hanhi, Kalle; et al., "Elastomeric Materials", 2007, Tampere University of Technology, pp. 16-18 and 55-57 (Year: 2007).
International Search Report and Written Opinion for PCT/US2015/049827 mailed Dec. 3, 2015.
Kamarulzaman, Nor H.; et al., "Identification of VOCs from natural rubber by different headspace techniques coupled using GC-MS", Sep. 7, 2018, Talanta (Year: 2018).
Vimalasiri, et al., "A Rapid and Accurate Method for Determining the Volatile Matter Content of Raw Natural Rubber", Rubber Research Institute 'Dartonfield', Agalawatta, Sri Lanka, Polymer Testing 7 (1987) pp. 317-323.

* cited by examiner

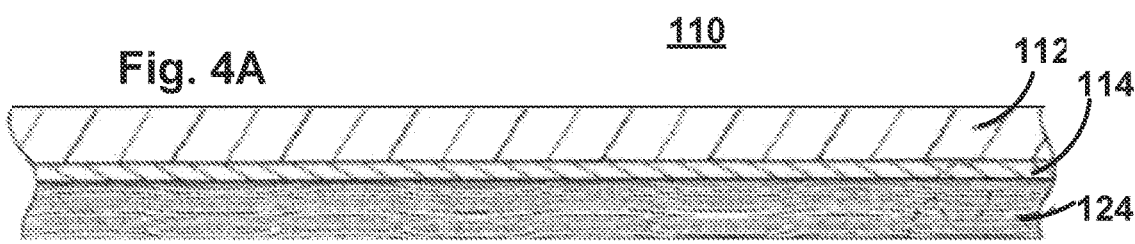
Fig. 4A
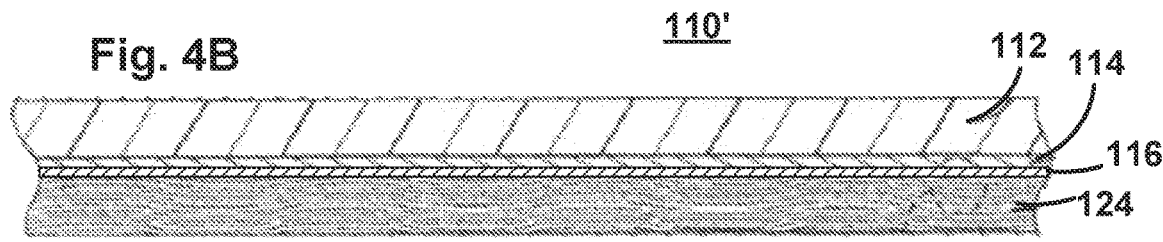
Fig. 4B
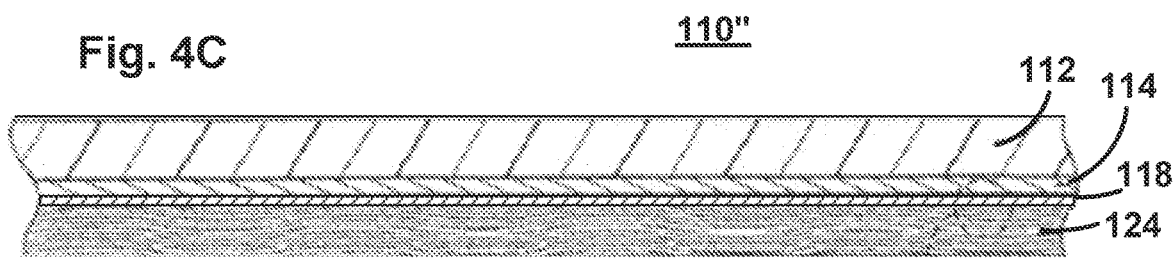
Fig. 4C
Fig. 5

MULTI-LAYERED STRUCTURES AND USES THEREOF

CROSS-REFERENCE TO RELATED APPLICATIONS

This application is a continuation of U.S. patent application Ser. No. 16/534,261, filed Aug. 7, 2019, entitled "MULTI-LAYERED STRUCTURES AND USES THEREOF," which application claims the benefit of and priority to U.S. Provisional Application Ser. No. 62/730,651, filed Sep. 13, 2018, entitled "MULTI-LAYERED STRUCTURES AND USES THEREOF," the contents of which are each incorporated by reference in their entirety.

BACKGROUND

Multi-layered structures having excellent fluid (gas or liquid) barrier properties are needed for constructing gas-filled bladders, cushioning devices, tires, and other structures. The multi-layered structures need to have low gas transmission rates for nitrogen or other gases.

Thermoset and thermoplastic polymers are used in these applications because of their excellent flexibility. Thermoplastic polymers, including thermoplastic polyurethanes ("TPUs"), have desirable characteristics because their scraps can be reclaimed, melted or ground, and reused to produce new thermoplastic articles.

BRIEF DESCRIPTION OF THE DRAWINGS

FIGS. 4A-4C illustrate a cross section view of membrane including cap layers and a core layer.

FIG. 5 shows an expanded view of a section of the membrane of FIG. 4.

DESCRIPTION

Figure 1:
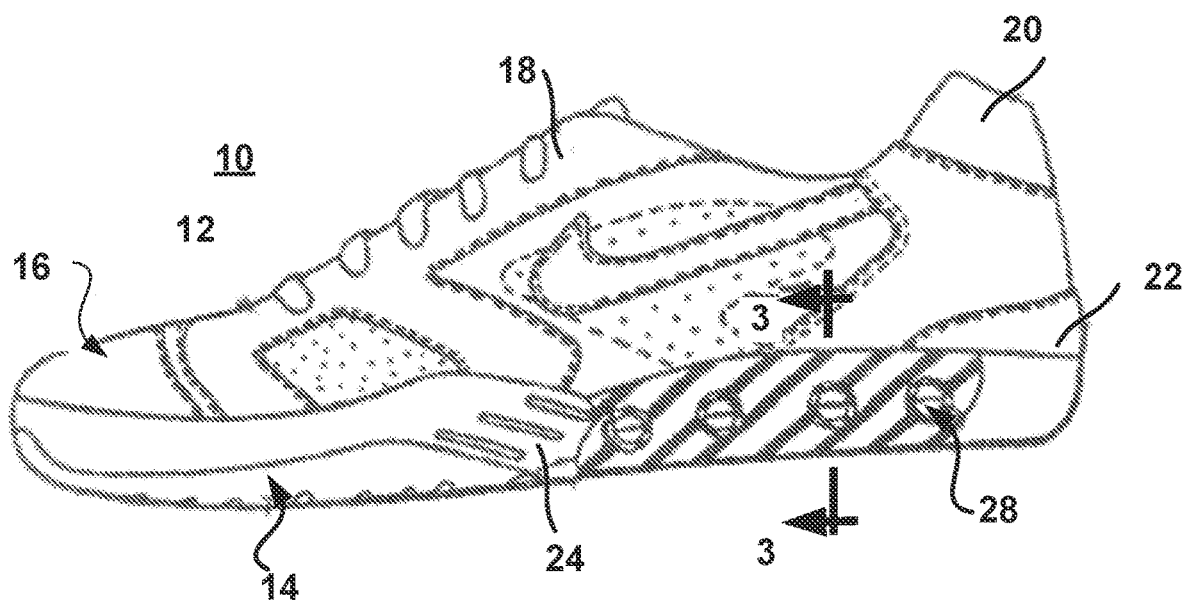
FIG. 1 is a side elevational view of an athletic shoe with a portion of the midsole cut-a-way to expose a cross-sectional view.

The present disclosure relates to a multi-layered structure, where the multi-layered structure includes a core and at least one cap layer. The core layer has a first side and a second side, while the multi-layered structure includes at least a first cap layer having a cap layer first side and a cap layer second side. The first side of the first cap layer is adjacent (e.g., in direct contact with or has one or more layers (e.g., tie layer, curing package layer, etc. between the core and the cap layer) the first side of the core layer. The first cap layer can include one or more polydiene polyol-based polyurethane having one or more different characteristics or qualities to enhance the performance of the multi-layered structure by improved bonding with the core and/or a rubber disposed on the cap layer. For example, in an aspect, the polydiene polyol-based has polyol-derived segments and isocyanate-derived segments. About 1 to 90 percent on a molar basis of the polyol-derived segments in the polydiene polyol-based thermoplastic polyurethane (TPU) include one or more carbon-carbon double bonds. In another example, the polydiene polyol-based TPU can have a tack strength of at least 1 Newton per millimeter and a melting point of about 70 to 150 degrees Celsius. In yet another example, the polydiene polyol-based TPU can have a tack strength of at least 1 Newton per millimeter and a melting point of about 70 to 150 degrees Celsius and has polyol-derived segments and isocyanate-derived segments, where about 1 to 90 percent on a molar basis of the polyol-derived segments in the first polydiene polyol-based TPU include one or more carbon-carbon double bonds. In an aspect, 50 percent or less on a molar basis of the polyol-derived segments in the first polydiene polyol-based TPU include one or more carbon-carbon double bonds. In an aspect, 50 percent or more on a molar basis of the polyol-derived segments in the first polydiene polyol-based TPU do not include carbon-carbon double bonds.

The present disclosure provides for a cap layer that can also include an uncured rubber compound, which can enhance bonding with rubber. The uncured rubber compound can include less than 5 weight percent of volatile compounds, where the volatile compounds are volatile compounds released from the uncured rubber compound when the uncured rubber compound is heated to a temperature of about 200 degrees Celsius, and where the weight percent of volatile compounds is based on a total amount of uncured rubber composition present in the cap layer material. It has been found that one source of the bubbles is off-gassing of volatile materials during the vulcanization process. It is believed that using rubber formulations with less than 5 weight percent of materials which can be volatilized when the rubber formulation is heated to about 200 degrees Celsius is effective in reducing bubble formation. In some examples, the cap layer can bond (e.g., covalently) to another layer (e.g., a rubber layer) that is directly in contact with the first cap layer.

The core layer can have a gas transmission rate of about 0.05 to 0.1 cc/(m² 24 hr atm) for $N_2$ measured at 23 degrees Celsius and 0 percent relative humidity. The core layer includes a multi-layer polymeric material. The multi-layer polymeric material can include alternating thermoplastic materials and barrier microlayers or layers of a first thermoplastic material and a second thermoplastic material, where a layer of the second thermoplastic material has a lower gas permeability than a layer of the first thermoplastic material. The layer of the second thermoplastic material can have an average thickness of about 0.1 microns to about 50 microns. In some aspects, the multi-layer polymeric material includes ethylene-vinyl alcohol copolymer layers.

The multi-layer structure can be incorporated into, be part of, or relates to articles of manufacture such as tires, articles of footwear, components of footwear, articles of apparel, components of apparel, articles of sporting equipment, components of sporting equipment, and the like. The articles of manufacture can include a tire, where the multi-layer structure is bonded to a rubber layer of the tire. At the interface (referred to as the "interface region") of the cap layer of the multi-layer structure and the rubber layer, the interface region is substantially free of gas bubbles, or, if gas bubbles are present, the gas bubbles in the interface region have a total surface area of less than 20 percent of a total surface area of the interface region. The reduction of the bubbles during off-gassing during the vulcanization process can reduce or eliminate the bubbles in the interface region. This reduction can be achieved by using rubber formulations with less than 5 weight percent of materials which can be volatilized when the rubber formulation is heated to about 200 degrees Celsius.

The present disclosure provides for a multi-layered structure comprising: a core layer having a first side and a second side, wherein the core layer has a gas transmission rate of about 0.05 to 0.1 cc/(m² 24 hr atm) for $N_2$ measured at 23 degrees Celsius and 0 percent relative humidity; and a first cap layer, the first cap layer having a cap layer first side and a cap layer second side, the cap layer first side is adjacent with the first side of the core layer; wherein the first cap layer comprises a cap layer material comprising at least one polydiene polyol-based polyurethane. The cap layer material further comprises an uncured rubber compound, wherein the uncured rubber compound includes less than 5 weight percent of volatile compounds, wherein the volatile compounds are volatile compounds released from the uncured rubber compound when the uncured rubber compound is heated to a temperature of about 200 degrees Celsius, and wherein the weight percent of volatile compounds is based on a total amount of uncured rubber composition present in the cap layer material.

The at least one polydiene polyol-based polyurethane is a polydiene polyol-based thermoplastic polyurethane (TPU). The at least one polydiene polyol-based can be a first polydiene polyol-based TPU having polyol-derived segments and isocyanate-derived segments, wherein about 1 to 90 percent on a molar basis of the polyol-derived segments in the first polydiene polyol-based TPU include one or more carbon-carbon double bonds; is a second polydiene polyol-based TPU having a tack strength of at least 1 Newton per millimeter and a melting point of about 70 to 150 degrees Celsius, or is a third polydiene polyol-based TPU having a tack strength of at least 1 Newton per millimeter and a melting point of about 70 to 150 degrees Celsius and having polyol-derived segments and isocyanate-derived segments, wherein about 1 to 90 percent on a molar basis of the polyol-derived segments in the first polydiene polyol-based TPU include one or more carbon-carbon double bonds.

The cap layer first side and the first side of the core layer can be separated by one or more of a tie layer and a curing package layer. The curing package has an initiation temperature that is less than the melting temperature of the cap layer.

The cap layer further can comprises a curing package, wherein the curing package has an initiation temperature higher than the melting temperature of the cap layer material.

The multi-layered structure can further comprise a rubber layer disposed on the second side of the cap layer. The rubber layer can comprise an uncured rubber compound which includes less than 5 weight percent of volatile compounds, wherein the volatile compounds are volatile compounds released from the uncured rubber compound when the uncured rubber compound is heated to a temperature of about 200 degrees Celsius. The rubber layer can be the crosslinked reaction product of an uncured rubber compound which includes less than 5 weight percent of volatile compounds, wherein the volatile compounds are volatile compounds released from the uncured rubber compound when the uncured rubber compound is heated to a temperature of about 200 degrees Celsius.

The multi-layered structure can include an interface region located at the interface between the rubber layer and the cap layer, wherein the interface region is substantially free of gas bubbles, or, if gas bubbles are present, the gas bubbles in the interface region have a total surface area of less than 20 percent of a total surface area of the interface region.

The present disclosure can provide for an article comprises the multi-layered structure as described above and herein. The article can be a tire. The article can be an article of footwear, a component of footwear, apparel, a component of apparel, sporting equipment, or a component of sporting equipment, a personal protective article, a flexible flotation device, a rigid flotation device, a medical device, a prosthetic device, an orthopedic device, an accumulator, or article of furniture.

The present disclosure provides for a method of manufacturing the multi-layered structure described above and herein, wherein the method comprises: laminating or co-extruding the core layer with the first cap layer; the core layer having the first side and the second side; and the first cap layer having the cap layer first side and the cap layer second side, the first side of the first cap layer being adjacent the first side of the core layer.

The present disclosure provides for a method of manufacturing the multi-layered structure as described above and herein, comprising: extruding the core layer, the core layer having the first side and the second side; and laminating or transfer-coating the first cap layer onto the core layer, the first cap layer having the cap layer first side and the cap layer second side, the first side of the first cap layer being adjacent the first side of the core layer. The present disclosure provides for a method of making a vulcanized article, comprising: placing a cap layer of a multi-layered structure as described above and herein in direct contact with a portion of uncured or partially cured rubber to form a layered article; and exposing the layered article to a condition effective to vulcanize at least the portion of the uncured or partially cured rubber in direct contact with the cap layer to fully cure the uncured or partially cured rubber, producing the vulcanized article. The present disclosure also provides for a vulcanized article made by the method as described above and herein.

The present disclosure provides for a vulcanized article comprising: a multi-layered structure as described above and herein bonded to a vulcanized rubber layer.

Now having describe aspect of the present disclosure generally, additional discussion regarding aspects will be described in greater detail.

This disclosure is not limited to particular aspects described, and as such may, of course, vary. The terminology used herein serves the purpose of describing particular aspects only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual aspects described and illustrated herein has discrete components and features which may be readily separated from or combined with the features of any of the other several aspects without departing from the scope or spirit of the present disclosure. Any recited method may be carried out in the order of events recited or in any other order that is logically possible.

The present disclosure employs, unless otherwise indicated, techniques of material science, chemistry, textiles, polymer chemistry, and the like, which are within the skill of the art. Such techniques are explained fully in the literature.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Now having described aspects of the present disclosure broadly, additional aspects and features will be described. The multi-layered structure includes the core and at least one cap layer adjacent one another (e.g., in direct contact with or has one or more layers between them), while the multi-layered structure can also optionally include a tie layer, a curing package layer, a release layer, or the like between core and the cap layer on outer surface of the multi-layered structure on the cap layer. The cap layer can include one or more polydiene polyol-based polyurethane and optionally uncured rubber, where these materials can enhance bonding to the core layer and/or other layers (e.g., rubber).

The core layer can have a gas transmission rate of about 0.05 to 0.1 cc/(m$^2$ 24 hr atm) for $N_2$ measured at 23 degrees Celsius and 0 percent relative humidity. The core layer can include a multi-layer polymeric material and can include alternating layer of materials. The average thickness of about 0.1 microns to about 50 microns and the number of layers can vary from 2 to 50 or more.

When the cap layer includes the uncured rubber compound, the uncured rubber compound can include less than 5 weight percent of volatile compounds. The volatile compounds are volatile compounds released from the uncured rubber compound when the uncured rubber compound is heated to a temperature of about 200 degrees Celsius, and where the weight percent of volatile compounds is based on a total amount of uncured rubber composition present in the cap layer material. The multi-layer structure is used bond to another substrate such as rubber, there is an interface region between the cap layer and the rubber layer. Using this type of formulation can be effective in reducing bubble formation in the interface region so that it is substantially free (e.g., less than 1 percent of the surface area of the interface region is covered in bubbles) of gas bubbles, or, if gas bubbles are present, the gas bubbles in the interface region have a total surface area of less than 20 percent or 10 percent of a total surface area of the interface region.

The cap layer material can include about 100 weight percent of the polydiene polyol-based polyurethane or about 20 weight percent to about 80 weight percent of the polydiene polyol-based polyurethane (e.g., from about 25 weight percent to about 50 weight percent; about 30 weight percent to about 70 weight percent; about 30 weight percent to about 75 weight percent; or about 50 weight percent to about 80 weight percent) and about 20 weight percent to about 80 weight percent of the rubber compound (e.g., from about 25 weight percent to about 50 weight percent; from about 30 weight percent to about 70 weight percent; about 30 weight percent to about 75 weight percent; or about 50 weight percent to about 80 weight percent). It should be understood that the cap layer can include additional components, for example, a curing package. Thus, for example, the cap layer can further include at least one curing package in an amount less than about 2 weight percent of cap layer material.

The multi-layered structures of the present disclosure can be formed by various processing techniques including, for example, extrusion, blow molding, injection molding, vacuum molding, rotary molding, transfer molding, pressure forming, heat sealing, casting, low-pressure casting, spin casting, reaction injection molding, radio frequency (RF) welding, and the like. Multilayer structures are conveniently made by co-extrusion followed by heat sealing or welding to give a highly flexible, inflatable multi-layered structure.

As described above, the multi-layer structure can be incorporated into, be part of, or relates to articles of manufacture described herein. The articles of manufacture can include tires (vehicle tires, bicycle tires, inner tubes, or the like), shoes (dress shoes, athletic footwear, hiking boots, work boots, or the like), skates (hockey skates, figure skates, in-line skates, roller skates, or the like), balls (soccer balls, footballs, basketballs, kickballs, etc.), bicycle seats, saddles, personal protective articles (e.g., helmets, shin guards, hockey gloves, chest protectors), flexible flotation devices (life jackets), rigid flotation devices (e.g., boat hulls), medical devices (e.g., catheter balloons), prosthetic devices, orthopedic devices, accumulators, or article of furniture made from the multi-layered structures or from the bladders, cushioning devices, or substantially closed containers. Multi-layer structure of the present disclosure can be used in the construction, among other things, of inflated structures such as gas-filled bladders or cushioning devices (e.g., for automobiles and trucks, such as pneumatic shock absorbers) having good moisture resistance and very low gas transmission rates. The multi-layer structure can be used in substantially closed containers, such containers may be designed with a one-way valve or similar construction that allows a fluid (gas or liquid) to enter the container easily but is effective in preventing the fluid from escaping the container. Inclusion of the polydiene polyol-based polymer and/or rubber in the cap layer enables the production of multi-layer structures having superior properties (e.g., bonding to rubber, the core layer materials, etc.) than other structures.

The disclosure also include articles of manufacture that utilize the multi-layered structures described herein in fluid conduits, including hoses, such as fuel- or air-line hoses. Fuel-line hoses suffer, among other things, gasoline and alcohol permeation regardless of the type of rubber used. The rubber layer can then be cured to the cap layer to obtain a hose that can be used for, among other things, fuel-lines.

Figure 2:
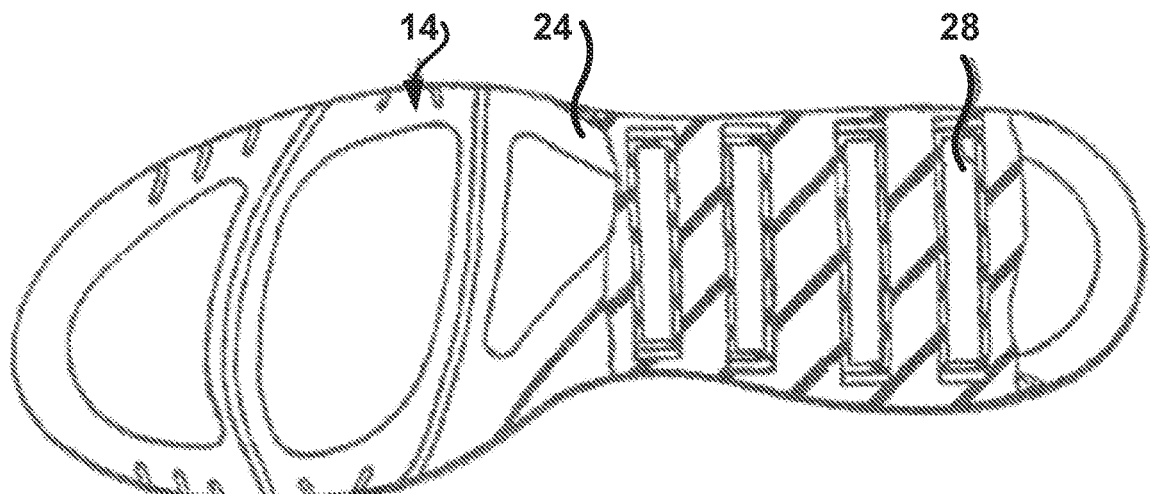
FIG. 2 is a bottom elevational view of the athletic shoe of FIG. 1 with a portion cut-a-way to expose another cross-sectional view.
Figure 3:
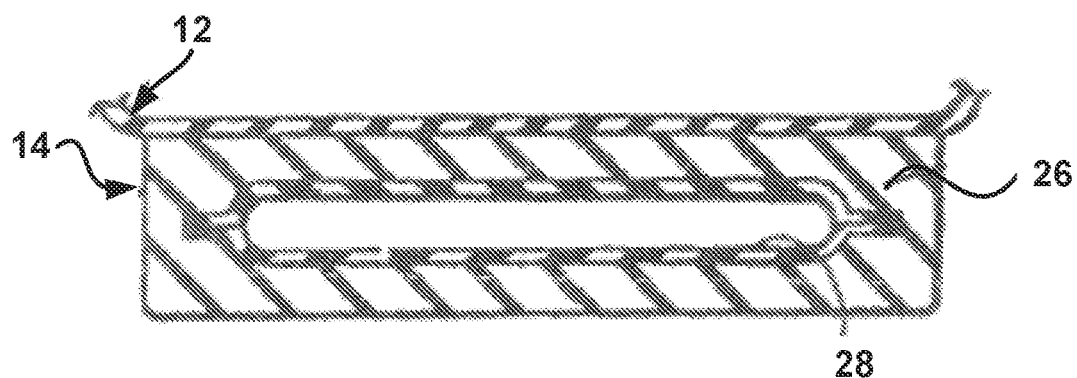
FIG. 3 is a section view taken along line 3-3 of FIG. 1.

FIGS. 1-3 illustrate an athletic shoe including a sole structure including a cushioning device fabricated from a multi-layered structure of the disclosure. The shoe 10 includes a shoe upper 12 to which the sole structure 14 is attached. The shoe upper 12 can be formed from a variety of conventional materials including, e.g., leathers, molded polymeric components, and textiles, including non-woven textiles including synthetic leathers, woven textiles, and knit textiles. Typically, the shoe upper 12 includes reinforcements located around the toe box 16, the lacing eyelets 18, the collar 20 and the heel counter 22. As with most athletic shoes, the sole structure 14 extends generally the entire length of the shoe 10 from the toe region through the midfoot region 24 and back to the heel portion.

The sole structure 14 includes a bladder 28 made of the multi-layered structure disposed in the mid-sole 26 of the sole structure 14. The bladder or bladders 28 can be formed having various geometries such as a single tubular member or a plurality of tubular members positioned in a spaced apart, parallel relationship to each other within the heel region of the mid-sole 26 portion of the sole structure 14. The bladder or bladders 28 are sealed inflatable multi-layered structures containing fluid (e.g., nitrogen gas). The bladder or bladders can be fabricated by welding together one or more sheets of multi-layered extruded or laminated film, while in other instances the bladder or bladders can be formed by blow molding one or more sheets of multi-layered extruded or laminated film.

FIGS. 4A-4C and 5 illustrate multi-layered structure configurations within the disclosure. As shown in FIG. 4A, the multi-layered structure 110 has a core layer 124 and a cap layer 114. Another layer 112 such as a rubber layer can be disposed adjacent to the cap layer 114. FIG. 5 shows an expanded view of a section of the multi-layered structure 110 of FIG. 4A. A portion of cap layer 114 borders a portion of core layer 124. Discrete, alternating microlayers 142 and 140 are shown.

FIG. 4B illustrates a multi-layered structure 110' has a core layer 124 and a cap layer 114. Another layer 112 such as a rubber layer can be disposed adjacent to the cap layer 114. In addition, a tie layer 116 is disposed between the core layer 124 and the cap layer 114.

FIG. 4C illustrates a multi-layered structure 110" has a core layer 124 and a cap layer 114. Another layer 112 such as a rubber layer can be disposed adjacent to the cap layer 114. In addition, a curing package layer 118 is disposed between the core layer 124 and the cap layer 114.

Figure 6A:
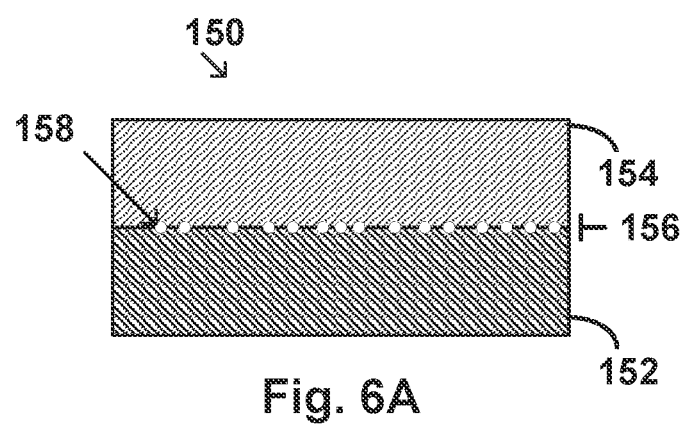
FIGS. 6A and 6B illustrate a cross section view of a structure having the multi-layered structure bonded to substrate such as rubber.
Figure 6B:
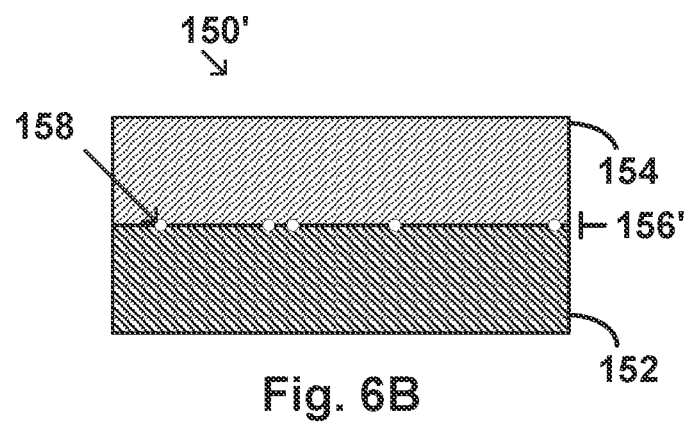

FIGS. 6A and 6B illustrate a cross-sectional view of a structure 150 having the cap layer 152 bonded to a rubber layer 154. Also, illustrated is the interface region 156 between the cap layer 152 and the rubber layer 154. The interface region 156 can include bubbles 158 due to the volatilization of volatile materials in the cap layer 152 and/or the rubber layer 154. FIG. 6A illustrates the structure 150 having the interface region 156 having a large amount (as defined by the surface area of the interface region) of bubbles 158 that can deteriorate the performance of the structure 150, while FIG. 6B illustrates structure 150' having interface region 156' having a small amount (less than 20 percent of a total surface area of the interface region) of bubbles 158, which allows structure 150' to have relatively superior properties to that of structure 150. The interface region does not have a specific thickness and may or may not appear as a "layer", but the area at which the layers contact one another is understood as the interface region.

In some examples, the multi-layered structures of the various examples of the present disclosure have at least excellent resistance to fatigue failure. The multi-layered structure resists fatigue failure when, for example, it can undergo repeated flexing and/or deformation and substantially recover without delamination along the layer interfaces or without creating a crack that runs through the thickness of the multi-layered structure, preferably over a broad range of temperatures.

The peel strength of the cap layer in the multi-layered structure and a substrate (e.g., a rubber layer, a thermoplastic layer, etc.) in direct contact with the cap layer can be about 1 Newton/mm to about 6 Newton/mm as determined using ASTM method D902-98 (2010). In another example, the peel strength of the cap layer in the multi-layered structures and a rubber substrate in direct contact with the cap layer can be about 1 Newton/mm to about 3 Newton/mm as determined using ASTM method D902-98 (2010).

The multi-layered structures can have tensile properties that reflect good strength and resilience. In particular, the multi-layered structures can have at least one of the following characteristics: (1) a tensile strength of at least about 2000 psi, or of at least about 3000 psi; (2) a 100 percent tensile modulus of 350 to 3000 psi; (3) an elongation of at least 200 percent, or of 200 percent to 700 percent.

The core can include a multi-layer polymeric material (e.g., a film) including two or more polymeric layers (e.g., 2 to 20 or more), where each layer can independently have a thickness of about 0.1 to 50 mils. The multi-layer polymeric material can comprise alternating layers of a first thermoplastic material and a second thermoplastic material. The first thermoplastic material and the second thermoplastic material of the multi-layer polymeric material is formed of an elastomeric material. The elastomeric material can include one or more thermoplastic polyurethanes.

The core layer can be a polymeric composite having at least about 10 polymer layers, or at least about 20 polymer layers, or at least about 50 polymer layers. In fact, the core layer can have thousands of microlayers, and the skilled artisan will appreciate that the number of microlayers can depend upon such factors as the particular materials chosen, thicknesses of each layer, the thickness of the core layer, the processing conditions, and the intended use of the core layer. The core layer can include about 10 to about 1000 microlayers, or about 30 to about 1000 microlayers, or about 50 to about 500 layers.

Each of the polymeric layers can independently be formed of a thermoplastic material. The thermoplastic material can include an elastomeric material, such as a thermoplastic elastomeric material. The thermoplastic materials can include thermoplastic polyurethane (TPU) (additional details are provided below). The thermoplastic materials can include polyester-based TPU, polyether-based TPU, polycaprolactone-based TPU, polycarbonate-based TPU, polysiloxane-based TPU, or combinations thereof. Non-limiting examples of thermoplastic material that can be used include: "PELLETHANE" 2355-85ATP and 2355-95AE (Dow Chemical Company, Midland, MI, USA), "ELASTOLLAN" (BASF Corporation, Wyandotte, MI, USA) and "ESTANE" (Lubrizol, Brecksville, OH, USA), all of which are either ester or ether based. Additional thermoplastic material can include those described in U.S. Pat. Nos. 5,713,141; 5,952, 065; 6,082,025; 6,127,026; 6,013,340; 6,203,868; and 6,321,465, which are incorporated herein by reference.

The polymeric layer can be formed of one or more of the following: ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials as well as with the TPUs described herein and optionally including combinations of polyimides and crystalline polymers, are also suitable. For instance, blends of polyimides and liquid crystal polymers, blends of polyamides and polyethylene terephthalate, and blends of polyamides with styrenics are suitable.

Specific examples of polymeric materials of the polymeric layer can include acrylonitrile copolymers such as "BAREX" resins, available from Ineos (Rolle, Switzerland); polyurethane engineering plastics such as "ISPLASTE" TPU available from Lubrizol (Brecksville, OH, USA); ethylene-vinyl alcohol copolymers marketed under the tradenames "EVAL" by Kuraray (Houston TX), "SOARNOL" by Nippon Gohsei (Hull, England, and "SELAR OH" by DuPont (Wilmington, DE, USA); polyvinylidiene chloride available from S.C. Johnson (Racine, WI, USA) under the tradename "SARAN", and from Solvay (Brussels, Belgium) under the tradename "IXAN"; liquid crystal polymers such as "VECTRA" from Celanese (Irving TX, USA) and "XYDAR" from Solvay; "MDX6" nylon, and amorphous nylons such as "NOVAMID" X21 from Koninklijke DSM N.V (Heerlen, Netherlands), "SELAR PA" from DuPont; polyetherimides sold under the tradename "ULTEM" by SABIC (Riyadh, Saudi Arabia); poly(vinyl alcohol)s; and polymethylpentene resins available from Mitsui Chemicals (Tokyo, Japan) under the tradename "TPX".

Rach polymeric layer of the film can be formed of a thermoplastic material which can include a combination of thermoplastic polymers. In addition to one or more thermoplastic polymers, the thermoplastic material can optionally include a colorant, a filler, a processing aid, a free radical scavenger, an ultraviolet light absorber, and the like. Each polymeric layer of the film can be made of a different thermoplastic material including a different type of thermoplastic polymer.

Additional details are provided regarding the polymers referenced herein in particular those polymer materials used in reference to the core (e.g., thermoplastic materials, polymeric layers, etc.) and cap layer. The polymer can be a thermoset polymer or a thermoplastic polymer. The polymer can include one or more polymers selected from the group consisting of polyesters, polyethers, polyamides, polyurethanes and polyolefins as well as copolymers of each or combinations thereof, such as those described herein. The polymer can be selected from: polyurethanes, polyesters, polyamides, vinyl polymers (e.g., copolymer of vinyl alcohol, vinyl esters, ethylene, acrylates, methacrylates, styrene, and so on), polyacrylonitrile, polyphenylene ethers, polycarbonates, elastomers, (e.g., polyurethane elastomers (e.g., polyester-polyurethanes, polyether-polyurethanes, and polycarbonate-polyurethanes), polyurea elastomers, polyamide elastomers (PEBA or polyether block polyamides), polyester elastomers, styrene block copolymer elastomers), a co-polymer thereof, a combination thereof, and the like.

The polymer can include polymers of the same or different types of monomers (e.g., homopolymers and copolymers, including terpolymers). The polymer can include different monomers randomly distributed in the polymer (e.g., a random co-polymer). The term "polymer" refers to a polymerized molecule having one or more monomer species that can be the same or different. When the monomer species are the same, the polymer can be termed homopolymer and when the monomers are different, the polymer can be referred to as a copolymer. The term "copolymer" is a polymer having two or more types of monomer species, and includes terpolymers (i.e., copolymers having three monomer species). In an aspect, the "monomer" can include different functional groups or segments, but for simplicity is generally referred to as a monomer.

For example, the polymer can be a polymer having repeating polymeric units of the same chemical structure (segments) which are relatively harder (isocyanate-derived or hard segments), and repeating polymeric segments which are relatively softer (polyol-derived segments or soft segments). In various aspects, the polymer has repeating hard segments and soft segments, physical crosslinks can be present within the segments or between the segments or both within and between the segments. Particular examples of hard segments include isocyanate segments. Particular examples of soft segments include an alkoxy group such as polyether segments and polyester segments. As used herein, the polymeric segment can be referred to as being a particular type of polymeric segment such as, for example, an isocyanate segment (e.g., diisocyanate segment), an alkoxy polyamide segment (e.g., a polyether segment, a polyester segment), and the like. It is understood that the chemical structure of the segment is derived from the described chemical structure. For example, an isocyanate segment is a polymerized unit including an isocyanate functional group. When referring to polymeric segments of a particular chemical structure, the polymer can contain up to 10 mol percent of segments of other chemical structures. For example, as used herein, a polyether segment is understood to include up to 10 mol percent of non-polyether segments.

The polymer can be a thermoplastic polymer. In general, a thermoplastic polymer softens or melts when heated and returns to a solid state when cooled. The thermoplastic polymer transitions from a solid state to a softened state when heated to a glass transition temperature of the thermoplastic polymer and a liquid state when heated to a melting temperature of the thermoplastic polymer. When sufficiently cooled, the thermoplastic polymer transitions from the softened or liquid state to the solid state. As such, the thermoplastic polymer may be softened or melted, molded, cooled, re-softened or re-melted, re-molded, and cooled again through multiple cycles.

The polymer can be a thermoset polymer. As used herein, "thermoset material" can refer to an uncured material and/or a partially cured or cured material layer, in the uncured and partially cured or cured state, and "thermoset polymer" refers to a thermoset material in its at least partially or fully cured state. A thermoset material is a material (e.g., prepolymer material) that can be in a variety of states depending upon the particular material that can be cured using thermal energy and/or actinic radiation (e.g., ultraviolet radiation, visible radiation, high energy radiation, infrared radiation) to form a partially cured or cured material layer. The curing can be promoted, for example, with the use of high pressure and/or a catalyst. In an aspect, the curing reaction is irreversible since it causes cross-linking and/or polymerization reactions of the thermoset material. In an aspect, thermosetting resins are usually malleable or liquid prior to curing, and are often designed to be molded into their final shape, or used as adhesives. Once hardened a thermoset resin cannot be re-melted in order to be reshaped. The textured surface can be set into the thermoset material by curing uncured thermoset material to lock in the textured surface of the textured structure.

Polyurethane

In certain aspects, the polymer can be a polyurethane, such as a thermoplastic polyurethane (also referred to as "TPU"). Alternatively, the polymer can be a thermoset polyurethane. Additionally, polyurethane can be an elastomeric polyurethane, including an elastomeric TPU or an elastomeric thermoset TPU. In aspects, the elastomeric polyurethane polymer can include hard and soft segments. In aspects, the hard segments can comprise or consist of isocyanate segments (e.g., diisocyanate segments). In the same or alternative aspects, the soft segments can comprise or consist of alkoxy segments (e.g., polyether segments, or polyester segments, or a combination of polyether segments and polyester segments). In a particular aspect, the polyurethane can comprise or consist essentially of an elastomeric polyurethane having repeating hard segments and repeating soft segments. Additional details regarding polydiene polyol-based thermoplastic polyurethane (TPU) is provided below.

One or more of the polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

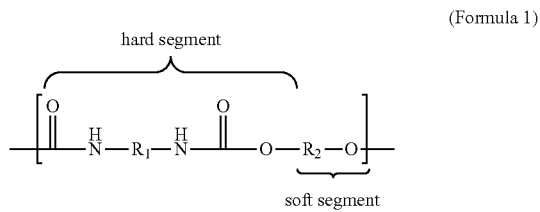

(Formula 1)

Each $R_1$ and $R_2$ independently is an aliphatic or aromatic segment. Optionally, each $R_2$ can be a hydrophilic segment.

Additionally, the isocyanates can also be chain extended with one or more chain extenders to bridge two or more isocyanates. This can produce polyurethane polymer chains as illustrated below in Formula 2, where $R_3$ includes the chain extender. As with each R, and $R_3$, each $R_3$ independently is an aliphatic or aromatic segment.

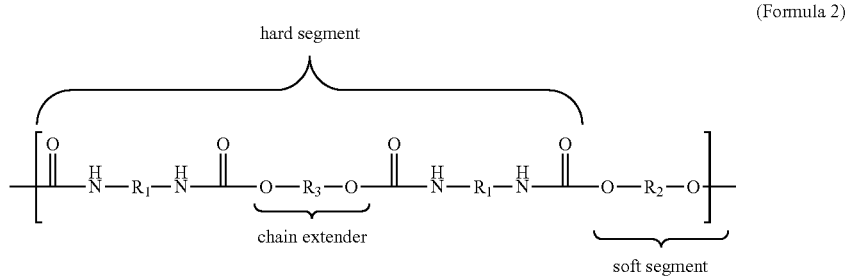

(Formula 2)

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5 percent to 85 percent by weight, from 5 percent to 70 percent by weight, or from 10 percent to 50 percent by weight, based on the total weight of the reactant monomers.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

The diisocyanate segments can include aliphatic diisocyanate segments. In one aspect, a majority of the diisocyanate segments comprise the aliphatic diisocyanate segments. In an aspect, at least 90 percent of the diisocyanate segments are aliphatic diisocyanate segments. In an aspect, the diisocyanate segments consist essentially of aliphatic diisocyanate segments. In an aspect, the aliphatic diisocyanate segments are substantially (e.g., about 50 percent or more, about 60 percent or more, about 70 percent or more, about 80 percent or more, about 90 percent or more) linear aliphatic diisocyanate segments. In an aspect, at least 80 percent of the aliphatic diisocyanate segments are aliphatic diisocyanate segments that are free of side chains. In an aspect, the aliphatic diisocyanate segments include C2-C10 linear aliphatic diisocyanate segments.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some aspects, the polymer chains are substantially free of aromatic groups.

The polyurethane polymer chains can be produced from diisocyanates including HMDI, TDI, MDI, $H_{12}$ aliphatics, and combinations thereof. For example, the low processing temperature polymeric composition of the present disclosure can comprise one or more polyurethane polymer chains are produced from diisocyanates including HMDI, TDI, MDI, H12 aliphatics, and combinations thereof.

The polyurethane chains which are at least partially crosslinked or which can be crosslinked, can be used in accordance with the present disclosure. It is possible to produce crosslinked or crosslinkable polyurethane chains using multi-functional isocyantes. Examples of suitable triisocyanates for producing the polyurethane polymer chains include TDI, HDI, and IPDI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane polymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

Segment $R_2$ in Formula 1 and 2 can include a polyether group, a polyester group, a polycarbonate group, an aliphatic group, or an aromatic group. Each segment $R_2$ can be present in an amount of 5 percent to 85 percent by weight, from 5 percent to 70 percent by weight, or from 10 percent to 50 percent by weight, based on the total weight of the reactant monomers.

In some examples, at least one $R_2$ segment of the thermoplastic polyurethane includes a polyether segment (i.e., a segment having one or more ether groups). Suitable polyethers include, but are not limited to, polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the polyurethane, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly(propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

In various examples of the polyurethanes, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term Cn means the alkylene group has "n" carbon atoms. For example, $C_{1-6}$ alkylene refers to an alkylene group having, e.g., 1, 2, 3, 4, 5, or 6 carbon atoms. The term "alkenylene" refers to a bivalent hydrocarbon having at least one double bond.

In various examples, the aliphatic and aromatic groups can be substituted with one or more pendant relatively hydrophilic and/or charged groups. In some aspects, the pendant hydrophilic group includes one or more (e.g., 2, 3, 4, 5, 6, 7, 8, 9, 10 or more) hydroxyl groups. In various aspects, the pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

The $R_2$ segment can include charged groups that are capable of binding to a counterion to ionically crosslink the polymer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

The pendant hydrophilic group is a polyether group (e.g., a polyethylene oxide group, a polyethylene glycol group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. In some aspects, the linker can be 4,4'-diphenylmethane diisocyanate (MDI), as shown below.

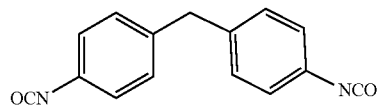
(Formula 3)

In some exemplary examples, the pendant hydrophilic group is a polyethylene oxide group and the linking group is MDI, as shown below.

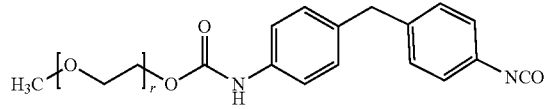
(Formula 4)

In some examples, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

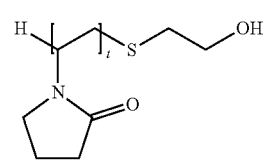
(Formula 5)

In some of the examples disclosed herein, at least one $R_2$ segment includes a polytetramethylene oxide group. In other exemplary aspects, at least one $R_2$ segment can include an aliphatic polyol group functionalized with a polyethylene oxide group or polyvinylpyrrolidone group, such as the polyols described in E.P. Patent No. 2 462 908, which is hereby incorporated by reference. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

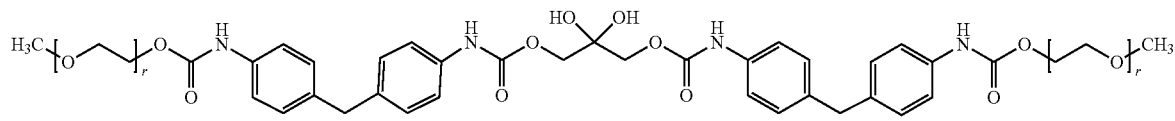
(Formula 6)

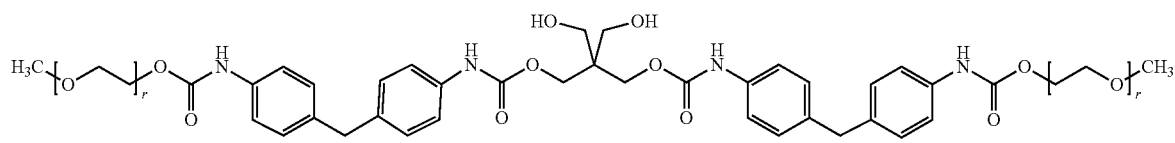
(Formula 7)

(Formula 8)

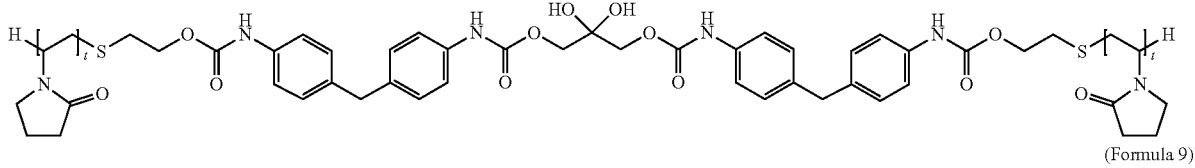

(Formula 9)

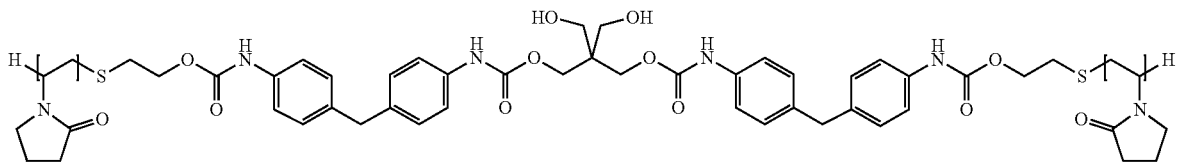

In various examples, at least one $R_2$ is a polysiloxane, In these cases, $R_2$ can be derived from a silicone monomer of Formula 10, such as a silicone monomer disclosed in U.S. Pat. No. 5,969,076, which is hereby incorporated by reference:

(Formula 10)

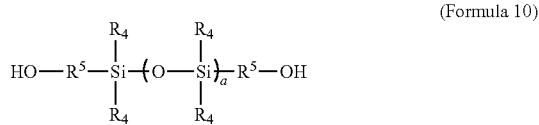

wherein: a is 1 to 10 or larger (e.g., 1, 2, 3, 4, 5, 6, 7, 8, 9, or 10); each $R_4$ independently is hydrogen, $C_{1-18}$ alkyl, $C_{2-18}$ alkenyl, aryl, or polyether; and each $R_5$ independently is $C_{1-10}$ alkylene, polyether, or polyurethane.

In some examples, each $R_4$ independently is a H, $C_{1-10}$ alkyl, $C_{2-10}$ alkenyl, $C_{1-6}$ aryl, polyethylene, polypropylene, or polybutylene group. For example, each $R_4$ can independently be selected from the group consisting of methyl, ethyl, n-propyl, isopropyl, n-butyl, isobutyl, s-butyl, t-butyl, ethenyl, propenyl, phenyl, and polyethylene groups.

In various examples, each $R_5$ independently includes a $C_{1-10}$ alkylene group (e.g., a methylene, ethylene, propylene, butylene, pentylene, hexylene, heptylene, octylene, nonylene, or decylene group). In other cases, each $R_5$ is a polyether group (e.g., a polyethylene, polypropylene, or polybutylene group). In various cases, each $R_5$ is a polyurethane group.

Optionally, the polyurethane can include an at least partially crosslinked polymeric network that includes polymer chains that are derivatives of polyurethane. In some cases, the level of crosslinking is such that the polyurethane retains thermoplastic properties (i.e., the crosslinked thermoplastic polyurethane can be softened or melted and re-solidified under the processing conditions described herein). In other aspects, the crosslinked polyurethane is a thermoset polymer. This crosslinked polymeric network can be produced by polymerizing one or more isocyanates with one or more polyamino compounds, polysulfhydryl compounds, or combinations thereof, as shown in Formulas 11 and 12, below:

(Formula 11)

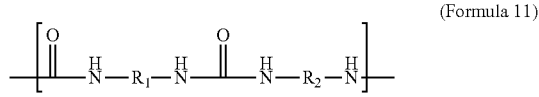

(Formula 12)

$$\left[\begin{array}{c}O\\\|\\-N-R_1-N\\H\quad\;\;H\end{array}\begin{array}{c}O\\\|\\\\\end{array}S-R_2-S\right]$$

where the variables are as described above. Additionally, the isocyanates can also be chain extended with one or more polyamino or polythiol chain extenders to bridge two or more isocyanates, such as previously described for the polyurethanes of Formula 2.

As described herein, the thermoplastic polyurethane can be physically crosslinked through e.g., nonpolar or polar interactions between the urethane or carbamate groups on the polymers (the hard segments. In these aspects, component R, in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane having physically crosslinked hard and soft segments can be a hydrophilic thermoplastic polyurethane (i.e., a thermoplastic polyurethane including hydrophilic groups as disclosed herein).

In some examples, the polyurethane is a thermoplastic polyurethane is composed of MDI, PTMO, and 1,4-butylene glycol, as described in U.S. Pat. No. 4,523,005. Commercially available polyurethanes suitable for the present use include, but are not limited to those under the tradename "SANCURE" (e.g., the SANCURE series of polymer such as SANCURE 20025F) or "TECOPHILIC" (e.g., TG-500, TG-2000, SP-80A-150, SP-93A-100, SP-60D-60) (Lubrizol, Countryside, IL, USA), "PELLETHANE" 2355-85ATP and 2355-95AE (Dow Chemical Company, Midland, MI, USA), "ESTANE" (e.g., ALR G 500, or 58213; Lubrizol, Countryside, IL, USA).

Now having described polyurethanes, additional details will be provided for olefinic TPU such as polydiene polyol-based TPUs. The polydiene polyol-based TPUs can be made by reacting a polydiene polyol, a polyisocyanate (such as described herein), and, in some embodiments, a chain extender (such as described herein). The polydiene polyol can be a polybutadiene polyol, a polyisoprene polyol, or a partially or fully hydrogenated derivative of a polybutadiene polyol or of a polyisoprene polyol, or any combination thereof. In some cases, the polydiene polyol-based TPU may be available commercially. The polydiene polyol-based TPU can be made using approaches as described herein using a polydiene polyol.

The polydiene polyol-based TPUs can be linear and thus the polyisocyanate component can be substantially di-functional. Suitable diisocyanates used to prepare the TPUs can be well known aromatic, aliphatic, and cycloaliphatic diisocyanates as well as others described herein. Examples include diphenylmethane diisocyanate (MDI), polymeric MDIs (PMDI), isophorone diisocyanate (IPDI), hydrogenated MDIs (e.g., H12MDI), cyclohexyl diisocyanate (CHDI), tetramethylxylylene diisocyanates (TMXDI), 1,6-hexamethylene diisocyanate (HDI), 1,4-butylene diisocyanate, lysine diisocyanate, toluene diisocyanates, xylylenediisocyanates (XDI), hydrogenated XDIs (e.g., H6XDI), p-phenylene diisocyanate, napththalene diisocyanates (NDI), 4-chloro-1,3-phenylene diisocyanate, 1,5-tetrahydronaphthalene diisocyanate, 4,4'-dibenzyl diisocyanate, and the like, and combinations thereof.

The polydiene polyols for use in making the polydiene polyol-based TPUs are well known, and many are available commercially. The polydiene polyols can have an average hydroxyl functionality within the range of 1.7 to 2.5. Polydiene diols having an average hydroxyl functionality within the range of 1.8 to 2.1 can be used. Polydiene diols having an average hydroxyl functionality within the range of from 1.9 to 2.0 can be used.

The polydiene polyols can be hydroxyl-terminated polydienes. Examples include polybutadiene polyols, polyisoprene polyols, and the like. The polyols can be partially or fully hydrogenated. Polybutadiene polyols, including polybutadiene diols, can be used. Suitable polydiene polyols are available commercially from Cray Valley Hydrocarbon Specialty Chemicals, a brand of Total SA (Courbevoie, France), under the "KRASOL" and "POLY BD" tradenames. Examples include "KRASOL" LBH 2000 and "KRASOL" LBH 3000, which have secondary hydroxyl groups, and "KRASOL" LBH-P 2000 and "KRASOL" LBH-P 3000, which have primary hydroxyl groups. Hydrogenated products include "KRASOL" HLBH-P 2000 and "KRASOL" HLBH-P 3000. Other suitable commercial products include "POLY BD" R-45HTLO, "POLY BD" R-45V, "POLY BD" R-20LM, and "POLY BD" R-45M.

The polydiene polyol can be unsaturated or at least partially unsaturated. The polydiene polyols can have an iodine value within the range of 50 to 500 g/100 g, or from 200 to 450 g/100 g.

The polydiene polyol can have a hydroxyl number within the range of 11 to 560 mg KOH/g. The polydiene polyol can have a hydroxyl number within the range of from 28 to 250 mg KOH/g. The polydiene polyol can have a hydroxyl number within the range of from 28 to 112 mg KOH/g.

The polydiene polyol-based TPU can be made from a polybutadiene polyol, a polyisoprene polyol, or a partially or fully hydrogenated derivative of a polybutadiene polyol or a polyisoprene polyol.

The polydiene polyol-based TPU including at least one hard segment and at least one soft segment can have a hard segment content of about 20 weight percent to about 50 weight percent (e.g., about 25 weight percent to about 45 weight percent; about 30 weight percent to about 40 weight percent; or about 20 weight percent to about 40 weight percent). The polydiene polyol-based TPU including at least one hard segment and at least one soft segment can have a soft segment content of about 50 weight percent to about 80 weight percent (e.g., about 50 weight percent to about 75 weight percent; about 60 weight percent to about 80 weight percent; or about 65 weight percent to about 80 weight percent). The polydiene polyol-based TPU including at least one hard segment and at least one soft segment can have a hard segment content of about 20 weight percent to about 50 weight percent, and a soft segment content of about 50 weight percent to about 80 weight percent.

The polydiene polyol-based TPU can include at least one hard segment (also referred to as "isocyanate-derived segment" and used interchangeably) and at least one soft segment (also referred to as "polyol-derived segment" and used interchangeably). In an aspect, about 1 percent to about 90 percent, about 1 percent to up to 50 percent, about 1 percent to about 40 percent, about 1 percent to about 30 percent, or about 1 to 20 percent, each on a molar basis, of the polyol-derived segments in the polydiene polyol-based TPU include one or more double bonds. In an aspect, about 10 percent to about 99 percent, 50 percent to 99 percent, about 60 percent to 99 percent, about 70 percent to 99 percent, or about 80 percent to 99 percent, each on a molar basis, polyol-derived segments in the polydiene polyol-based TPU do not include double bonds. In aspects, the polyol-derived segments that do not include carbon-carbon double bonds comprise one or more of a polyester functional group and a polyether functional group.

The polydiene polyol-based TPU can have a tack strength of at least 1 Newton per millimeter or about 1 Newton per millimeter to 3 Newton per millimeter (using ASTM method D902-98 (2010)) and a melting point of about 70 to 150 degrees Celsius, about 80 to 150 degrees Celsius, or about 90 to 150 degrees Celsius.

The polydiene polyol-based TPU can have a tack strength of at least 1 Newton per millimeter or about 1 Newton per millimeter to 3 Newton per millimeter and a melting point of about 70 to 150 degrees Celsius, about 80 to 150 degrees Celsius, or about 90 to 150 degrees Celsius, while also the polydiene polyol-based TPU has about 1 to 90 percent, about 1 percent to up to 50 percent, about 1 percent to about 40 percent, about 1 percent to about 30 percent, or about 1 to 20 percent, each on a molar basis, of the polyol-derived segments in the polydiene polyol-based TPU include one or more double bonds and/or about 10 percent to about 99 percent, 50 percent to 99 percent, about 60 percent to 99 percent, about 70 percent to 99 percent, or about 80 percent to 99 percent, each on a molar basis, of the polyol-derived segments in the polydiene polyol-based TPU do not include double bonds.

In some aspects, the soft segment comprises, consists essentially of or consists of soft segments derived from hydroxyl-terminated diols (e.g., poly-($C_1$-$C_6$)-hydroxyl-terminated diols), unsubstituted or substituted (where substituted includes replacement of one or more hydrogens with a halogen). In some embodiments, the soft segments are derived from hydroxyl-terminated diols that are based on homopolymers of butadiene. Non-limiting examples of soft segments are those derived from hydroxyl-terminated diols such as hydroxyl-terminated polybutadiene (HTPB) resins including hydroxyl-terminated polybutadiene resins sold under the "KRASOL" tradename. These HTPB resins include "POLY BD" R-45HTLO Resin, "POLY BD" R-20LM Resin, "POLY BD" 605E, "KRASOL" LBH 2000, "KRASOL" LBH 3000, "KRASOL" LBH-P 2000, "KRASOL" LBH-P 3000, "KRASOL" HLBH-P 2000, and "KRASOL" HLBH-P 3000.

"POLY BD" R-45HTLO Resin has the general formula:

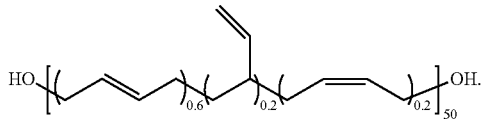

Poly Bd® R-20LM Resin has the general formula:

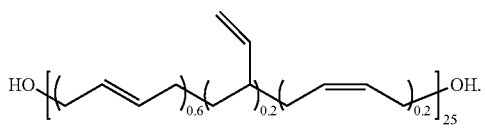

Poly Bd® 605E has the general formula:

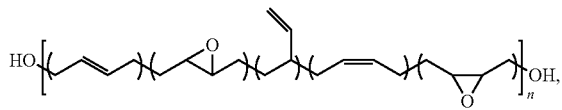

where n is an integer sufficient to give the resin a molecular weight ($M_n$) of about 1,300 g/mol.

The "KRASOL" LBH 2000 and "KRASOL" LBH 3000 series of resins are linear polybutadiene polymers with hydroxyl end groups having a molecular weight ($M_n$) of about 2,000 to about 3,000 g/mol. The "KRASOL" LBH-P 2000 and "KRASOL" LBH-P 3000, series of resins are linear polybutadiene polymers with primary hydroxyl end groups having a molecular weight ($M_n$) of about 2,000 to about 3,000 g/mol. The "KRASOL" HLBH-P 2000 and "KRASOL" HLBH-P 3000 are saturated aliphatic liquid polyols having a molecular weight ($M_n$) of about 2,000 to about 3,000 g/mol.

In some examples, the hard segment comprises, consists essentially of or consists of —($C_6$-$C_{18}$)-arylene-($C_1$-$C_6$)-alkylene-($C_6$-$C_{18}$)-arylene segments (e.g., —($C_6$-$C_{10}$)-arylene-($C_1$-$C_3$)-alkylene-($C_6$-$C_{10}$)-arylene segments; and -phenylene-methylene-phenylene segments), unsubstituted or substituted.

The term "($C_1$-$C_6$)alkylene" as used herein refers to straight chain and branched, saturated groups having 1 to 6 carbon atoms. Examples of straight chain ($C_1$-$C_6$)alkylene groups include those with 1 to 6 carbon atoms such as —$CH_2$—, —$CH_2CH_2$—, —$CH_2CH_2CH_2$—, —$CH_2CH_2CH_2CH_2$—, and —$CH_2CH_2CH_2CH_2CH_2$—. Examples of branched ($C_1$-$C_6$)alkylene groups include —CH($CH_3$)$CH_2$— and —$CH_2$CH($CH_3$)$CH_2$—), unsubstituted or substituted.

The term "($C_6$-$C_{18}$)arylene" as used herein refers to divalent groups that are derived by removing two hydrogen atoms from an arene, which is a cyclic aromatic hydrocarbon, having 6 to 18 carbon atoms, 10 to 18 carbon atoms, 12 to 18 carbon atoms, 6 to about 10 carbon atoms or 6 to 8 carbon atoms, unsubstituted or substituted. Examples of ($C_6$-$C_{18}$)arylene groups include:

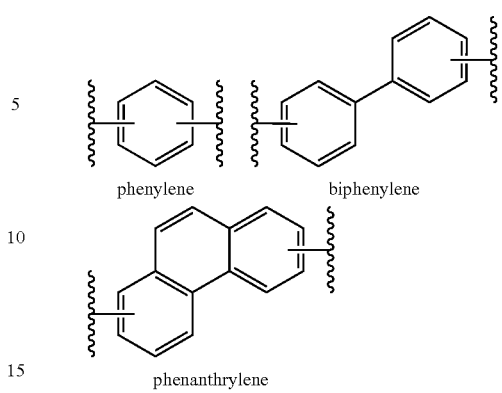

where the wavy lines represent the points of attachment to, e.g., —($C_1$-$C_6$)-alkylene group. In some aspects, the multi-layered structure further includes structural layers. In some aspects, the structural layers can be formed of repurposed (e.g., ground or re-ground) polymeric materials, such as the thermoplastic materials described herein.

Polyamides

In various examples, the polymer can comprise a polyamide, such as a thermoplastic polyamide, or a thermoset polyamide. In some aspects, the polyamide can be an elastomeric polyamide, including an elastomeric thermoplastic polyamide or an elastomeric thermoset polyamide. The polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a co-polyamide, or can be a random co-polyamide. The copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

The polyamide can be a polyamide-containing block co-polymer. For example, the block co-polymer can have repeating hard segments, and repeating soft segments. In an aspect, the hard segments can comprise polyamide segments, and the soft segments can comprise non-polyamide segments. The polyamide-containing block co-polymer can be an elastomeric co-polyamide comprising or consisting of polyamide-containing block co-polymers having repeating hard segments and repeating soft segments. In block co-polymers, including block co-polymers having repeating hard segments and soft segments, physical crosslinks can be present within the segments or between the segments or both within and between the segments.

The polyamide itself, or the polyamide segment of the polyamide-containing block co-polymer can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide can be the same or different.

The polyamide or the polyamide segment of the polyamide-containing block co-polymer is derived from the polycondensation of lactams and/or amino acids, and includes an amide segment having a structure shown in Formula 13, below, wherein $R_6$ is the segment of the polyamide derived from the lactam or amino acid.

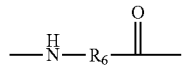

(Formula 13)

$R_6$ is derived from a lactam. In some cases, $R_6$ is derived from a $C_{3-20}$ lactam, or a $C_{4-15}$ lactam, or a $C_{612}$ lactam. For example, $R_6$ can be derived from caprolactam or laurolactam. In some cases, $R_6$ is derived from one or more amino acids. In various cases, $R_6$ is derived from a $C_{4-25}$ amino acid, or a $C_{5-20}$ amino acid, or a $C_{8-15}$ amino acid. For example, $R_6$ can be derived from 12-aminolauric acid or 11-aminoundecanoic acid.

Optionally, in order to increase the relative degree of hydrophilicity of the polyamide-containing block co-polymer, Formula 13 can include a polyamide-polyether block copolymer segment, as shown below:

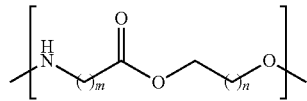

(Formula 14)

wherein m is 3-20, and n is 1-8. In some exemplary aspects, m is 4-15, or 6-12 (e.g., 6, 7, 8, 9, 10, 11, or 12), and n is 1, 2, or 3. For example, m can be 11 or 12, and n can be 1 or 3. In various aspects, the polyamide or the polyamide segment of the polyamide-containing block co-polymer is derived from the condensation of diamino compounds with dicarboxylic acids, or activated forms thereof, and includes an amide segment having a structure shown in Formula 15, below, wherein $R_7$ is the segment of the polyamide derived from the diamino compound, $R_8$ is the segment derived from the dicarboxylic acid compound:

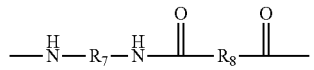

(Formula 15)

$R_7$ can be derived from a diamino compound that includes an aliphatic group having $C_{4-15}$ carbon atoms, or $C_{5-10}$ carbon atoms, or $C_{6-9}$ carbon atoms. The diamino compound can include an aromatic group, such as phenyl, naphthyl, xylyl, and tolyl. Suitable diamino compounds from which $R_7$ can be derived include, but are not limited to, hexamethylene diamine (HMD), tetramethylene diamine, trimethyl hexamethylene diamine (TMD), m-xylylene diamine (MXD), and 1,5-pentamine diamine. In various examples, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include, but are not limited to adipic acid, sebacic acid, terephthalic acid, and isophthalic acid. In some aspects, the polymer chains are substantially free of aromatic groups.

Each polyamide segment of the polyamide (including the polyamide-containing block co-polymer) is independently derived from a polyamide prepolymer selected from the group consisting of 12-aminolauric acid, caprolactam, hexamethylene diamine and adipic acid.

The polyamide can comprises or consists of a poly(ether-block-amide). The poly(ether-block-amide) can be formed from the polycondensation of a carboxylic acid terminated polyamide prepolymer and a hydroxyl terminated polyether prepolymer to form a poly(ether-block-amide), as shown in Formula 16:

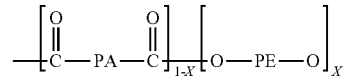

(Formula 16)

In various examples, a disclosed poly(ether block amide) polymer is prepared by polycondensation of polyamide blocks containing reactive ends with polyether blocks containing reactive ends. Examples include, but are not limited to: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

Disclosed poly(ether block amide) polymers include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. In various aspects, the copolymer comprises polyamide blocks comprising polyamide 12 or of polyamide 6.

Disclosed poly(ether block amide) polymers include those comprising polyamide blocks derived from the condensation of one or more a, w-aminocarboxylic acids and/or of one or more lactams containing from 6 to 12 carbon atoms in the presence of a dicarboxylic acid containing from 4 to 12 carbon atoms, and are of low mass, i.e., they have an Mn of from 400 to 1000. In poly(ether block amide) polymers of this type, a α, ω-aminocarboxylic acid such as aminoundecanoic acid or aminododecanoic acid can be used; a dicarboxylic acids such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98 percent and are preferably hydrogenated) and dodecanedioic acid HOOC—$(CH_2)10$-COOH can be used; and a lactam such as caprolactam and lauryllactam can be used; or various combinations of any of the foregoing. In various aspects, the copolymer comprises polyamide blocks obtained by condensation of lauryllactam in the presence of adipic acid or dodecanedioic acid and with a number average molecular weight of 750 have a melting point of 127-130 degrees Celsius. In a further aspect, the various constituents of the polyamide block and their proportion can be chosen in order to obtain a melting point of less than 150 degrees Celsius and advantageously between 90 degrees Celsius and 135 degrees Celsius.

Disclosed poly(ether block amide) polymers include those comprising polyamide blocks derived from the condensation of at least one α, ω-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be acrylic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

In various examples, the polyamide is a thermoplastic polyamide and the constituents of the polyamide block and their proportion can be chosen in order to obtain a melting point of less than 150 degrees Celsius and advantageously between 90 degrees Celsius and 135 degrees Celsius. In a further aspect, the various constituents of the thermoplastic polyamide block and their proportion can be chosen in order to obtain a melting point of less than 150 degrees Celsius and advantageously between 90 degrees Celsius and 135 degrees Celsius.

The number average molar mass of the polyamide blocks can be from about 300 grams per mole (g/mol) and about 15,000 g/mol, from about 500 g/mol and about 10,000 g/mol, from about 500 g/mol and about 6,000 g/mol, from about 500 g/mol to 5,000 g/mol, and from about 600 g/mol and about 5,000 g/mol. In a further aspect, the number average molecular weight of the polyether block can range from about 100 g/mol to about 6,000 g/mol, from about 400 g/mol to 3000 g/mol and from about 200 g/mol to about 3,000 g/mol. In a still further aspect, the polyether (PE) content (x) of the poly(ether block amide) polymer can be from about 0.05 to about 0.8 (i.e., from about 5 mole percent to about 80 mole percent). In a yet further aspect, the polyether blocks can be present from about 10 weight percent to about 50 weight percent, from about 20 weight percent to about 40 weight percent, and from about 30 weight percent to about 40 weight percent. The polyamide blocks can be present from about 50 weight percent to about 90 weight percent, from about 60 weight percent to about 80 weight percent, and from about 70 weight percent to about 90 weight percent.

The polyether blocks can contain units other than ethylene oxide units, such as, for example, propylene oxide or polytetrahydrofuran (which leads to polytetramethylene glycol sequences). It is also possible to use simultaneously PEG blocks, i.e. those consisting of ethylene oxide units, PPG blocks, i.e. those consisting of propylene oxide units, and PTMG blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 weight percent to about 50 weight percent of the copolymer and from about 35 weight percent to about 50 weight percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place between 180 and 300 degrees Celsius, preferably 200 to 290 degrees Celsius, and the pressure in the reactor is set between 5 and 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. In an aspect, the polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 millibar (5000 Pascals) at a temperature such that the reactants and the copolymers obtained are in the molten state. By way of example, this temperature can be between 100 and 400 degrees Celsius and usually between 200 and 250 degrees Celsius. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. Advantageously, the catalyst is a derivative of a metal (M) chosen from the group formed by titanium, zirconium and hafnium. In an aspect, the derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

In a further example, the catalyst can comprise a salt of the metal (M), particularly the salt of (M) and of an organic acid and the complex salts of the oxide of (M) and/or the hydroxide of (M) and an organic acid. In a still further aspect, the organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. In some aspects, M is zirconium and such salts are called zirconyl salts, e.g., the commercially available product sold under the name zirconyl acetate.

The weight proportion of catalyst varies from about 0.01 to about 5 percent of the weight of the mixture of the dicarboxylic polyamide with the polyetherdiol and the polyol. In a further aspect, the weight proportion of catalyst varies from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of very variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is between 5 and 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. In one aspect, it can be useful to blend a block copolymer having a high level of polyamide groups with a block copolymer having a higher level of polyether blocks, to produce a blend having an average level of polyether blocks of about 20 to 40 weight percent of the total blend of poly(amid-block-ether) copolymers, and preferably about 30 to 35 weight percent. In a further aspect, the copolymer comprises a blend of two different poly(ether-block-amide)s comprising at least one block copolymer having a level of polyether blocks below about 35 weight percent, and a second poly(ether-block-amide) having at least about 45 weight percent of polyether blocks.

Exemplary commercially available copolymers include, but are not limited to, those available under the tradenames of "VESTAMID" (Evonik Industries, Essen, Germany); "PLATAMID" (Arkema, Colombes, France), e.g., product code H2694; "PEBAX" (Arkema), e.g., product code "PEBAX MH1657" and "PEBAX MV1074"; "PEBAX RNEW" (Arkema); "GRILAMID" (EMS-Chemie AG, Domat/Ems, Switzerland), or also to other similar materials produced by various other suppliers.

The polyamide can be physically crosslinked through, e.g., nonpolar or polar interactions between the polyamide groups of the polymers. In examples where the polyamide is a copolyamide, the copolyamide can be physically crosslinked through interactions between the polyamide groups, and optionally by interactions between the copolymer groups. When the co-polyamide is physically crosslinked thorough interactions between the polyamide groups, the polyamide segments can form the portion of the polymer referred to as the "hard segment", and copolymer segments can form the portion of the polymer referred to as the "soft segment". For example, when the copolyamide is a poly (ether-block-amide), the polyamide segments form the hard segment portion of the polymer, and polyether segments can form the soft segment portion of the polymer. Therefore, in some examples, the polymer can include a physically crosslinked polymeric network having one or more polymer chains with amide linkages.

The polyamide segment of the co-polyamide can include polyamide-11 or polyamide-12 and the polyether segment is a segment selected from the group consisting of polyethylene oxide, polypropylene oxide, and polytetramethylene oxide segments, and combinations thereof.

Optionally, the polyamide can be partially or fully covalently crosslinked, as previously described herein. In some cases, the degree of crosslinking present in the polyamide is such that, when it is thermally processed, e.g., in the form of a yarn or fiber to form the articles of footwear of the present disclosure, the partially covalently crosslinked thermoplastic polyamide retains sufficient thermoplastic character that the partially covalently crosslinked thermoplastic polyamide is softened or melted during the processing and re-solidifies. In other cases, the crosslinked polyamide is a thermoset polymer.

Polyesters

The polymers can comprise a polyester. The polyester can comprise a thermoplastic polyester, or a thermoset polyester. Additionally, the polyester can be an elastomeric polyester, including a thermoplastic polyester or a thermoset elastomeric polyester. The polyester can be formed by reaction of one or more carboxylic acids, or its ester-forming derivatives, with one or more bivalent or multivalent aliphatic, alicyclic, aromatic or araliphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

The polyester is a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure (segments) which are relatively harder (hard segments), and repeating blocks of polymeric segments which are relatively softer (soft segments). In block co-polyesters, including block co-polyesters having repeating hard segments and soft segments, physical crosslinks can be present within the blocks or between the blocks or both within and between the blocks. In a particular aspect, the polymer can comprise or consist essentially of an elastomeric co-polyester having repeating blocks of hard segments and repeating blocks of soft segments.

The non-polyester segments of the co-polyester can comprise or consist of polyether segments, polyamide segments, or both polyether segments and polyamide segments. The co-polyester can be a block co-polyester, or can be a random co-polyester. The co-polyester can be formed from the polycondensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1-3 propanediol. Examples of co-polyesters include polyethelene adipate, polybutylene succinate, poly(3-hydroxybutyrate-co-3-hydroxyvalerate), polyethylene terephthalate, polybutylene terephthalate, polytrimethylene terephthalate, polyethylene napthalate, and combinations thereof. In a particular example, the co-polyamide can comprise or consist of polyethylene terephthalate.

The polyester is a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

The polyester can be a biodegradable resin, for example, a copolymerized polyester in which poly(α-hydroxy acid) such as polyglycolic acid or polylactic acid is contained as principal repeating units.

The disclosed polyesters can be prepared by a variety of polycondensation methods known to the skilled artisan, such as a solvent polymerization or a melt polymerization process.

Polyolefins

The polymers can comprise or consist essentially of a polyolefin. The polyolefin can be a thermoplastic polyolefin or a thermoset polyolefin. Additionally, the polyolefin can be an elastomeric polyolefin, including a thermoplastic elastomeric polyolefin or a thermoset elastomeric polyolefin. Exemplary of polyolefins useful can include, but are not limited to, polyethylene, polypropylene, and olefin elastomers (e.g., metallocene-catalyzed block copolymers of ethylene and α-olefins having 4 to about 8 carbon atoms). In a further aspect, the polyolefin is a polymer comprising a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary polyolefins useful in the disclosed compositions include polymers of cycloolefins such as cyclopentene or norbornene.

It is to be understood that polyethylene, which optionally can be crosslinked, is inclusive a variety of polyethylenes, including, but not limited to, low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monoolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

The polyolefin, as disclosed herein, can be formed through free radical, cationic, and/or anionic polymerization by methods well known to those skilled in the art (e.g., using a peroxide initiator, heat, and/or light). The disclosed polyolefin can be prepared by radical polymerization under high pressure and at elevated temperature. Alternatively, the polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. In various aspects, the metal complexes can be in the free form or fixed on substrates, typically on activated magnesium chloride, titanium(III) chloride, alumina or silicon oxide. It is understood that the metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable polyolefins can be prepared by polymerization of monomers of monoolefins and diolefins as described herein. Exemplary monomers that can be used to prepare disclosed polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbury mixer and a biaxial extruder.

The polyolefin can be a mixture of polyolefins, such as a mixture of two or more polyolefins disclosed herein above. For example, a suitable mixture of polyolefins can be a mixture of polypropylene with polyisobutylene, polypropylene with polyethylene (for example PP/HDPE, PP/LDPE) or mixtures of different types of polyethylene (for example LDPE/HDPE).

The polyolefin can be a copolymer of suitable monoolefin monomers or a copolymer of a suitable monoolefin monomer and a vinyl monomer. Exemplary polyolefin copolymers include, but are not limited to, ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

The polyolefin is a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin is a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

According to some examples, the polymeric material can further comprise, consist of, or consist essentially of one or more processing aids. These processing aids can be independently selected from the group including, but not limited to, curing agents, initiators, plasticizers, mold release agents, lubricants, antioxidants, flame retardants, dyes, pigments, reinforcing and non-reinforcing fillers, fiber reinforcements, and light stabilizers.

In some cases, the rubber compound (e.g., within the cap layer and/or the in rubber layer disposed on the cap layer), which can be uncured or partially cured, included in the blended material of the cap layer can be a natural rubber, a synthetic rubber, or a combination of both. Examples of rubber compounds that are contemplated herein include natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber or any combination thereof. In some examples, the rubber compound includes an isoprene rubber, a butyl rubber, a butadiene rubber, a styrene-butadiene rubber or any combination thereof. In some, more specific examples, the rubber compound includes styrene-butadiene rubber. Other examples of rubber compounds include, but are not limited to, elastomeric polymers, such as polyolefins, polynorbornene rubber, methyl methacrylate butadiene styrene rubber (MBS), styrene butadiene styrene rubber (SBS), styrene ethylene butylene (SEBS) rubber, silicone rubber, urethane rubber, and mixtures thereof. Still other examples of rubber compounds include elastomeric polymers, such as uncured rubber, including uncured natural rubber, uncured polyisoprene rubber, uncured butyl rubber, and the like.

The rubber compounds can further include fillers; process oils; and/or a curing package including at least one of crosslinking initiator(s), crosslinking accelerator(s), and crosslinking retarder(s). Examples of fillers include, but are not limited to, carbon black, silica, and talc. Examples of process oils include, but are not limited to, paraffin oil and/or aromatic oils. Examples of crosslinking initiators include, but are not limited to, sulfur or peroxide initiators such as di-t-amyl peroxide, di-t-butyl peroxide, t-butyl cumyl peroxide, di-cumyl peroxide (DCP), di(2-methyl-1-phenyl-2-propyl)peroxide, t-butyl 2-methyl-1-phenyl-2-propyl peroxide, di(t-butylperoxy)-diisopropylbenzene, 2,5-dimethyl-2,5-di(t-butylperoxy)hexane, 2,5-dimethyl-2,5-di(t-butylperoxy)hexyne-3,1,1-di(t-butylperoxy)-3,3,5-trimethylcyclohexane, 4,4-di(t-butylperoxy)-n-butylvalerate, and mixtures thereof. Examples of crosslinking accelerators include, but are not limited to, N-cyclohexyl-2-benzothiazole sulfenamide (CBZ), N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide; guanidine compounds, such as diphenylguanidine (DPG), triphenylguanidine, diorthonitrileguanidine, orthonitrile biguanide and diphenylguanidine phthalate; aldehyde amine compounds or aldehyde ammonia compounds, such as acetaldehyde-aniline reaction product, butylaldehyde-aniline condensate, hexamethylenetetramine and acetaldehyde ammonia; imidazoline compounds, such as 2-mercaptoimidazoline; thiourea compounds, such as thiocarbanilide, diethylthiourea, dibutylthiourea, trimethylthiourea and diorthotolylthiourea; thiuram compounds, such as tetramethylthiuram monosulfide, tetramethylthiuram disulfide, tetraethylthiuram disulfide, tetrabutylthiuram disulfide and pentamethylenethiuram tetrasulfide; dithioate compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthate compounds, such as zinc dibutylxanthogenate; and other compounds, such as zinc white. Examples of crosslinking retarders include, but are not limited to, alkoxyphenols, catechols, and benzoquinones, and alkoxyphenols such as 3,5-di-t-butyl-4-hydroxyanisol.

The rubber compound includes at least some level of curing, but is generally at least partially cured. Or stated another way, the rubber compound can be at least partially cured.

As used herein, the term "partially cured" generally refers to a compound (e.g., a rubber compound) having a relatively low crosslink density of less than or equal to $10^{-3}$ moles/cm$^3$, or less than or equal to $10^{-5}$ moles cm$^3$. For example, the partially cured polymeric compound can have about 15 to about 1500 monomer units present between crosslinks. Dynamic mechanical analysis (DMA) can be used to determine the modulus plateau for the compound. In the region of the modulus plateau above the glass transition temperature of the compound and below the melting point of the compound, the crosslink density is directly proportional to the modulus of the compound.

As used herein, the term "cured" generally refers to a compound (e.g., a rubber compound) having a relatively high crosslink density. For example, the crosslink density of the cured compound can be at least 20 percent greater, or at least 30 percent greater, or at least 50 percent greater than the crosslink density of the uncured or partially cured compound.

Examples of crosslinking reactions (i.e., vulcanization reactions) include, but are not limited to, free-radical reactions, ionic reactions (both anionic and cationic), addition reactions, and metal salt reactions. Crosslinking reactions can be initiated by actinic radiation, including heat, UV, electron beam or other high energy sources.

The method of making the multi-layered structure can include laminating or co-extruding the core layer with a first cap layer, where a side of the first cap layer being adjacent (e.g., directly in contact or with another there between them) a first side of the core layer. Optionally, in conjunction with the core layer and the first cap layer, a second cap layer can be laminated or co-extruded, where the second cap layer first side is adjacent a second side (the side opposite the first) of the core layer.

Benefits of a method including co-extruding a core layer with a cap layer include, but are not limited to, production of a thin cap layer, relative to other methods described herein; production of a more consistent gauge for the co-extruded core layer and cap layer, relative to other methods described herein; more sophisticated extrusion on core, relative to other methods described herein; and reduction of the labor-intensiveness of the process relative to other methods described herein. These methods also generally produce good adhesion between the cap layer and the core.

The method including laminating or co-extruding a core layer with a first cap layer and a second cap layer can be advantageous for one or more of the following: allowing for the substantially simultaneous application of the first and second cap layers onto the formed core, even though such a method may require specialized equipment or the "scrapping" of some startup materials. Other possible advantages of a method including laminating or co-extruding a core layer with a first cap layer and a second cap layer include, but are not limited to, is that, if the first and second cap layers are applied in a substantially sequential manner onto the core, the method becomes less capital-intensive, relative to other methods described herein, as it would use standard equipment, even though such method may require the scrapping of startup materials or can be more labor-intensive, relative to other methods described herein. These methods also typically produce good adhesion between the cap layers and the core The method of making the multi-layered structure includes extruding the core layer and laminating or transfer-coating the first cap layer onto the core layer, where the first side of the first cap layer being adjacent the first side of the core layer. Optionally, a second cap layer can be laminated or co-extruded onto the core layer, the first side adjacent the second side of the core layer, where the laminating or transfer-coating of the second cap layer is after the laminating or transfer-coating of the first cap layer. Optionally, a second cap layer can be laminated or co-extruded onto the core layer, the first side adjacent the second side of the core layer, where the laminating or transfer-coating of the second cap layer is substantially at the same time as the laminating or transfer-coating of the first cap layer.

As described herein, a curing package layer can be disposed onto the cap layer, while in other aspects the curing package can be included in the cap layer. In an aspect, the curing package, has an initiation temperature higher than the melting temperature of the cap layer material. In an aspect, the initiation temperature is about 160 degrees to 300 degrees Celsius or about 180 degrees to 300 degrees Celsius.

The curing package (e.g., curing agents) can be dissolved, suspended or otherwise dispersed in the cap layer material. When the curing agents are activated (e.g., by using heat or any other suitable form of radiation that effects activation of the curing agents), they effect chemical reactions that, in some examples, cause the cap layer to "cure to" (e.g., form covalent bonds with) the layer that is adjacent and directly in contact with the cap layer (e.g., the rubber layer, the tie layer, the core layer, and the like), thereby bonding cap layer to another layer that is directly in contact with at least one of the cap layer (e.g., bonding the core layer to the cap layer, bonding the cap layer to the rubber layer, etc.). The "chemical reactions" include, but are not limited to, crosslinking reactions (e.g., vulcanization) between the surfaces of the bulk material that makes up the cap layer and the surface of a layer that is directly in contact with the first cap layer.

The curing package layer can include at least one curing agent such as a sulfur-based (e.g., molecular sulfur) and peroxide-based curing agent. In particular, the curing agent is a peroxide-based curing agent selected from: dicumyl peroxide, t-butyl peroxide, zinc peroxide, 2,5-bis(t-butylperoxy)-2,5-dimethylhexane, p-methane hydroperoxide, cumene hydroperoxide, diisopropylbenzene hydroperoxide, di-tert-butyl peroxide, 2,5-dimethyl-2,5-di(tert-butylperoxy) hexane, 2,5-dimethyl-2,5-di(tert-butylperoxy)-hexyne-3, tert-butyl cumyl peroxide, α,α'-di(tert-butylperoxy) diisopropylbenzene, acetyl peroxide, propionyl peroxide, isobutyryl peroxide, octanoyl peroxide, 3,5,5-trimethylhexanoyl peroxide, decanoyl peroxide, lauroyl peroxide, benzoyl peroxide, p-chlorobenzoyl peroxide, 2,4-dichlorobenzoyl peroxide, diisopropyl perdicarbonate, di-2-ethylhexyl peroxycarbonate, acetyl cyclohexanesulfonyl peroxide, tert-butyl peracetate, tert-butyl perisobutyrate, tert-butyl perpivalate, tert-butyl per-2-ethylhexanoate, tert-butyl perneodecanoate, tert-butyl peroxybenzoate, tert-butyl isopropyl percarbonate, methyl ethyl ketone peroxide, cyclohexanone peroxide, 1,1-di-(tert-butylperoxy)cyclohexane, 1,1-di(tert-butylperoxy)-3,5,5-trimethylcyclohexane, and combinations thereof. In a particular, the curing agent can be dicumyl peroxide or t-butyl peroxide.

The method also includes applying the curing package to the cap layer (first and/or second cap layer). Here, the curing package can be a liquid curing package, a curing package dissolved in a solvent, or curing package suspended in a solvent, or any combination thereof. The curing package can be applied by spraying the curing package on the cap layer, dipping the cap layer in the curing package, or any combination thereof. In an aspect, applying the curing package to the the cap layer can be conducted prior to laminating or transfer-coating the cap layer onto the core layer. The curing package layer can be prepared using methods well known in the art. In some examples, the curing package layer can have a thickness of about 1000 μm or less (e.g., about 500 μm or less; about 250 μm or less; about 100 μm or less; 10 μm or less; from about 1 μm to about 1000 μm; about 100 μm to about 750 μm or about 10 μm to about 1000 μm).

When a solvent is present, the solvent can evaporate at a lower temperature than the initiation temperature so that the solvent can be removed by heating the material without initiating the curing package. In an aspect, the solvent can have the characteristic of penetrating into the cap layer without degrading the core layer. In an aspect, the solvent can be selected from ethyl acetate, toluene, acetone, and combinations thereof.

The method can include forming a tie layer between the cap layer and the core layer. In some aspects, a tie layer or an adhesive may be used to bond two or more layers. For example, a tie layer or adhesive could be used between the core layer and the cap layer, or between the core layer and the optional structural layer (e.g., rubber layer) when present, or between the optional structural layer when present and the cap layer, or any combination thereof. The choice of tie layer or adhesive will depend on the materials used for the layers to be bonded. When the layers to be joined are TPUs, other urethanes, polyacrylates, ethylene-acrylate copolymers, maleic anhydride grafted polyolefins, or the like might be utilized as the tie layer. Alternatively, in some aspects, the membrane may be free of a tie layer or adhesive. The presence of a tie layer or adhesive may prevent regrinding and recycling of any waste material generated during production of the membranes, bladders, cushioning devices, or end-use products that incorporate them. The tie layer can be prepared using methods well known in the art. In some examples, the tie layer can have a thickness of about 1000 μm or less (e.g., about 500 μm or less; about 250 μm or less; about 100 μm or less; 10 μm or less; from about 1 μm to about 1000 μm; about 100 μm to about 750 μm or about 10 μm to about 1000 μm).

The method can include applying a release layer to the second side of the cap layer so that the multi-layered structure includes at least one first release layer. In some aspects, the release layer can serve to protect the cap layers from among other things, against damage from a vulcanization process that is applied to a green tire, when the multi-layered structures described herein are used as components for tires. In an example, the release layer can be made of at least one material selected from a polyalkylene or a polyalkylene terephthalate. Examples of polyalkylenes include methyl-pentene copolymer, polyethylene, polypropylene, polyethylene terephthalate, polybutylene terephthalate, polyethylene naphthalate, polybutylene naphthalate, nylon 6, nylon 66 or a nylon 6/66 copolymer. In an aspect, the thickness of the release layer may be varied within a relatively wide range. The release layer can be prepared using methods well known in the art. In some examples, the release layer can have a thickness of about 1000 μm or less (e.g., about 500 μm or less; about 250 μm or less; about 100 μm or less; 10 μm or less; from about 1 μm to about 1000 μm; about 100 μm to about 750 μm or about 10 μm to about 1000 μm).

In an aspects, the cap layer further includes a tackifier. Examples of suitable tackifiers include rosins such as "FORAL 85", a stabilized rosin ester from Hercules, Inc. (Wilmington, DE, USA), the "SNOWTACK" series of gum rosins from Tenneco (Lake Forest, IL, USA), and the "AQUATAC" series of tall oil rosins from Kraton (Houston, TX, USA); and synthetic hydrocarbon resins such as the "PICCOLYTE A" series, polyterpenes from Hercules, Inc., the "ESCOREZ 1300" series of C5 aliphatic olefin-derived resins, the "ESCOREZ 2000" Series of C9 aromatic/aliphatic olefin-derived resins, and polyaromatic C9 resins, such as the "PICCO 5000" series of aromatic hydrocarbon resins, from Hercules, Inc. The tackifier, when present, can be present in an amount of less than about 40 weight percent of the cap layer (e.g., less than about 35 weight percent; less than about 30 weight percent; less than about 25 weight percent; less than about 20 weight percent; less than about 15 weight percent; less than about 10 weight percent; less than about 5 weight percent; less than about 1 weight percent; about 0.1 weight percent to about 35 weight percent; about 0.1 weight percent to about 10 weight percent; about 1 weight percent to about 5 weight percent; or about 0.1 weight percent to about 1 weight percent).

The multi-layered structure can be in the form of inflated structures such as gas-filled bladders, cushioning devices, impact arrestors, tires, bladders, and substantially closed containers made using the multi-layered structures described herein. For example, when affixed to or incorporated into the article, the inflated structure is at that point a fluid filled inflated structure but is often generally referred to as the inflated structure. The inflated structure can include a fluid such as a gas or liquid. In an aspect, the gas can include air, nitrogen gas, or other appropriate gas. In general, the inflated structures have good moisture resistance and very low gas transmission rates. The inflated structure can have a gas transmission rate for nitrogen gas, for example, wherein a multi-layered structure of a given thickness has a gas transmission rate for nitrogen that is at least about ten times lower than the gas transmission rate for nitrogen of a butyl rubber layer of substantially the same thickness as the thickness of the multi-layered structure. In an aspect, the inflated structure has a first inflated structure wall having a first inflated structure wall thickness (e.g., about 0.1 to 50 mils). The inflated structure (e.g., a bladder for use in footwear, apparel, and sporting goods) has a first inflated structure wall that can have a gas transmission rate (GTR) for nitrogen gas of less than about 15 $cm^3/m^2 \cdot atm \cdot day$, less than about 10 $m^3/m^2 \cdot atm \cdot day$, less than about 5 $cm^3/m^2 \cdot atm \cdot day$, less than about 1 $cm^3/m^2 \cdot atm \cdot day$ (e.g., from about 0.001 $cm^3/m^2 \cdot atm \cdot day$ to about 1 $cm^3/m^2 \cdot atm \cdot day$, about 0.01 $cm^3/m^2 \cdot atm \cdot day$ to about 1 $cm^3/m^2 \cdot atm \cdot day$ or about 0.1 $cm^3/m^2 \cdot atm \cdot day$ to about 1 $cm^3/m^2 \cdot atm \cdot day$) for an average wall thickness of 20 mils. An accepted method for measuring the relative permeance, permeability, and diffusion of inflated bladders is ASTM D-1434-82-V. See, e.g., U.S. Pat. No. 6,127,026, which is incorporated by reference as if fully set forth herein. According to ASTM D-1434-82-V, permeance, permeability and diffusion are measured by the following formulae:

Permeance (quantity of gas)/[(area)×(time)×(pressure difference)]=permeance(GTR)/(pressure difference)= $cm^3/m^2 \cdot atm \cdot day$(i.e.,24 hours)

Permeability

[(quantity of gas)×(film thickness)][(area)×(time)× (pressure difference)]=permeability

[(GTR)×(film thickness)]/(pressure difference)= [($cm^3$)(mil)]/$m^2 \cdot atm \cdot day$(i.e.,24 hours)

Diffusion at One Atmosphere (quantity of gas)/[(area)×(time)]=GTR=$cm^3/m^2 \cdot day$ (i.e.,24 hours)

The inflated structure can be made by applying heat, pressure and/or vacuum to the multi-layered structure.

The inflated structures can have a moisture content of 1 to 50 ppm when equilibrated for 24 h at 30 degree Celsius with a relative humidity of 50 percent; or the structures can have a moisture content of 1 to 25 ppm when equilibrated for 24 h at 30 degree Celsius with a relative humidity of 50 percent; or the structures can have a moisture content of 1 to 10 ppm when equilibrated for 24 h at 30 degree Celsius with a relative humidity of 50 percent.

The present disclosure provides for vulcanized articles and methods of making a vulcanized article. The method includes placing a cap layer of a multi-layered structure in direct contact with a portion of uncured or partially cured rubber (e.g., a rubber layer) to form a layered article. Subsequently, the layered article can be exposed to a condition effective to vulcanize at least the portion of the uncured or partially cured rubber in direct contact with the cap layer to fully cure the uncured or partially cured rubber, producing the vulcanized article. The multi-layered structure and the uncured or partially cured rubber can be disposed into a mold prior to vulcanization and then the vulcanized article is removed from the mold. The vulcanized article includes the multi-layered structure bonded to a vulcanized rubber layer.

The cap layer can a vulcanization accelerator (e.g., 0.1 to 15 weight percent of the blended material). Examples of vulcanization accelerators include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds and xanthate compounds. Examples of the guanidine compounds include 1,3-diphenylguanidine; examples of the sulfenamide compounds include N-(tert-butyl)-2-benzothiazolesulfenamide and N-cyclohexyl-2-benzothiazolyl sulfenamide; examples of the thiuram compounds include tetrabutylthiuram disulfide. These compounds may be used individually or two or more of them may be used in combination. The cap layer can include a vulcanization aid (e.g., about 0.1 to 15 weight percent of the blended material). Examples of vulcanization aids include aliphatic acids such as stearic acid; metal oxides such as zinc oxide; and metal salts of aliphatic acids such as zinc stearate. These compounds may be used individually or two or more of them may be used in combination.

CLAUSES OF THE PRESENT DISCLOSURE

Clause 1. A multi-layered structure comprising:
a core layer having a first side and a second side, wherein the core layer has a gas transmission rate of about 0.05 to 0.1 cc/($m^2$ 24 hr atm) for $N_2$ measured at 23 degrees Celsius and 0 percent relative humidity; and
a first cap layer, the first cap layer having a cap layer first side and a cap layer second side, the cap layer first side is adjacent with the first side of the core layer;
wherein the first cap layer comprises a cap layer material comprising at least one polydiene polyol-based polyurethane.

Clause 2. The multi-layered structure of clause 1, wherein the cap layer material further comprises an uncured rubber compound, wherein the uncured rubber compound includes less than 5 weight percent of volatile compounds, wherein the volatile compounds are volatile compounds released from the uncured rubber compound when the uncured rubber compound is heated to a temperature of about 200 degrees Celsius, and wherein the weight percent of volatile compounds is based on a total amount of uncured rubber composition present in the cap layer material.

Clause 3. The multi-layered structure of clauses 1 to 2, wherein the first cap layer comprises about 20 weight percent to about 80 weight percent of the at least one polydiene polyol-based polyurethane; and about 20 weight percent to about 80 weight percent of the uncured rubber compound.

Clause 4. The multi-layered structure of clause 1, wherein the at least one polydiene polyol-based polyurethane is a polydiene polyol-based thermoplastic polyurethane (TPU)

Clause 5. The multi-layered structure of clause 4, wherein the at least one polydiene polyol-based TPU: is a first polydiene polyol-based TPU having polyol-derived segments and isocyanate-derived segments, wherein about 1 to 90 percent on a molar basis of the polyol-derived segments in the first polydiene polyol-based TPU include one or more carbon-carbon double bonds; is a second polydiene polyol-based TPU having a tack strength of at least 1 Newton per millimeter and a melting point of about 70 to 150 degrees Celsius; or is a third polydiene polyol-based TPU having a tack strength of at least 1 Newton per millimeter and a melting point of about 70 to 150 degrees Celsius and has polyol-derived segments and isocyanate-derived segments, wherein about 1 to 90 percent on a molar basis of the polyol-derived segments in the first polydiene polyol-based TPU include one or more carbon-carbon double bonds.

Clause 6. The multi-layered structure of clause 5, wherein about 1 to up to 50 percent on a molar basis of the polyol-derived segments in the first polydiene polyol-based TPU include one or more carbon-carbon double bonds and greater than 50 percent on a molar basis of the polyol-derived segments do not include carbon-carbon double bonds.

Clause 7. The multi-layered structure of clause 5, wherein about 1 to up to 40 percent on a molar basis of the polyol-derived segments in the first polydiene polyol-based TPU include one or more carbon-carbon double bonds and greater than 60 percent on a molar basis of the polyol-derived segments do not include carbon-carbon double bonds.

Clause 8. The multi-layered structure of clause 5, wherein about 1 to up to 30 percent on a molar basis of the polyol-derived segments in the first polydiene polyol-based TPU include one or more carbon-carbon double bonds and greater than 70 percent on a molar basis of the polyol-derived segments do not include carbon-carbon double bonds.

Clause 9. The multi-layered structure of clauses 6-8, wherein the polyol-derived segments that do not include carbon-carbon double bonds comprise one or more of a polyester functional group and a polyether functional group.

Clause 10. The multi-layered structure of clauses 1-9, wherein the cap layer first side is in direct contact with the first side of the core layer.

Clause 11. The multi-layered structure of clauses 1-9, wherein the cap layer first side is in indirect contact with the first side of the core layer.

Clause 12. The multi-layered structure of clause 11, wherein the cap layer first side and the first side of the core layer are separated by one or more of a tie layer and a curing package layer.

Clause 13. The multi-layered structure of clause 12, wherein the curing package layer comprises a curing package.

Clause 14. The multi-layered structure of clause 13, wherein the curing package comprises a sulfur-based or peroxide-based curing agent.

Clause 15. The multi-layered structure of clauses 13-14, wherein the curing package has an initiation temperature that is less than the melting temperature of the cap layer.

Clause 16. The multi-layered structure of clause 13-15, wherein the curing package comprises the peroxide-based curing agent which is selected from: dicumyl peroxide, t-butyl peroxide, p-methane hydroperoxide, cumene hydroperoxide, diisopropylbenzene hydroperoxide, di-tert-butyl peroxide, 2,5-dimethyl-2,5-di(tert-butylperoxy)hexane, 2,5-dimethyl-2,5-di(tert-butylperoxy)-hexyne-3, tert-butyl cumyl peroxide, α,α'-di(tert-butylperoxy) diisopropylbenzene, acetyl peroxide, propionyl peroxide, isobutyryl peroxide, octanoyl peroxide, 3,5,5-trimethylhexanoyl peroxide, decanoyl peroxide, lauroyl peroxide, benzoyl peroxide, p-chlorobenzoyl peroxide, 2,4-dichlorobenzoyl peroxide, diisopropyl perdicarbonate, di-2-ethylhexyl peroxycarbonate, acetyl cyclohexanesulfonyl peroxide, tert-butyl peracetate, tert-butyl perisobutyrate, tert-butyl perpivalate, tert-butyl per-2-ethylhexanoate, tert-butyl perneodecanoate, tert-butyl peroxybenzoate, tert-butyl isopropyl percarbonate, methyl ethyl ketone peroxide, cyclohexanone peroxide, 1,1-di-(tert-butylperoxy)cyclohexane, 1,1-di(tert-butylperoxy)-3,5,5-trimethylcyclohexane, and combinations thereof.

Clause 17. The multi-layered structure of clauses 13-15, wherein the curing package comprises dicumyl peroxide, t-butyl peroxide, or a combination thereof.

Clause 18. The multi-layered structure of clauses 13-17, wherein the curing package includes a solvent that has an evaporation temperature less than the initiation temperature.

Clause 19. The multi-layered structure of clauses 9-13, wherein the curing package includes a solvent that has the characteristic of being able to penetrate the cap layer without degrading the core layer.

Clause 20. The multi-layered structure of clause 19, wherein the solvent is selected from ethyl acetate, toluene, acetone, and combinations thereof.

Clause 21. The multi-layered structure of clauses 1-11, wherein the cap layer further comprises a curing package, wherein the curing package has an initiation temperature higher than the melting temperature of the cap layer material.

Clause 22. The multi-layered structure of clause 21, wherein the initiation temperature is about 160 degrees to 300 degrees Celsius.

Clause 23. The multi-layered structure of clause 21, wherein the initiation temperature is about 180 degrees to 300 degrees Celsius.

Clause 24. The multi-layered structure of clause 21-23, wherein the curing package comprises the peroxide-based curing agent which is selected from: dicumyl peroxide, t-butyl peroxide, p-methane hydroperoxide, cumene hydroperoxide, diisopropylbenzene hydroperoxide, di-tert-butyl peroxide, 2,5-dimethyl-2,5-di(tert-butylperoxy)hexane, 2,5-dimethyl-2,5-di(tert-butylperoxy)-hexyne-3, tert-butyl cumyl peroxide, α,α'-di(tert-butylperoxy) diisopropylbenzene, acetyl peroxide, propionyl peroxide, isobutyryl peroxide, octanoyl peroxide, 3,5,5-trimethylhexanoyl peroxide, decanoyl peroxide, lauroyl peroxide, benzoyl peroxide, p-chlorobenzoyl peroxide, 2,4-dichlorobenzoyl peroxide, diisopropyl perdicarbonate, di-2-ethylhexyl peroxycarbonate, acetyl cyclohexanesulfonyl peroxide, tert-butyl peracetate, tert-butyl perisobutyrate, tert-butyl perpivalate, tert-butyl per-2-ethylhexanoate, tert-butyl perneodecanoate, tert-butyl peroxybenzoate, tert-butyl isopropyl percarbonate, methyl ethyl ketone peroxide, cyclohexanone peroxide, 1,1-di-(tert-butylperoxy)cyclohexane, 1,1-di(tert-butylperoxy)-3,5,5-trimethylcyclohexane, and combinations thereof.

Clause 25. The multi-layered structure of clause 21-23, wherein the curing package comprises t-butyl peroxide.

Clause 26. The multi-layered structure of clauses 19-25, wherein the curing package comprises less than about 2 weight percent of the first cap layer.

Clause 27. The multi-layered structure of clauses 1-26, wherein the tie layer comprises a urethane, a polyacrylate, an ethylene-acrylate copolymer, a maleic anhydride grafted polyolefin, and a combination thereof.

Clause 28. The multi-layered structure of clauses 1-27, further comprising a rubber layer disposed on the second side of the cap layer.

Clause 29. The multi-layered structure of clause 28, wherein the rubber layer comprises an uncured rubber compound which includes less than 5 weight percent of volatile compounds, wherein the volatile compounds are volatile compounds released from the uncured rubber compound when the uncured rubber compound is heated to a temperature of about 200 degrees Celsius.

Clause 30. The multi-layered structure of clause 1-27, further comprising a rubber layer disposed on the second side cap layer of the cap layer, wherein the rubber layer is bonded to and crosslinked with the cap layer.

Clause 31. The multi-layered structure of clause 30, wherein the rubber layer is the crosslinked reaction product of an uncured rubber compound which includes less than 5 weight percent of volatile compounds, wherein the volatile compounds are volatile compounds released from the uncured rubber compound when the uncured rubber compound is heated to a temperature of about 200 degrees Celsius.

Clause 32. The multi-layered structure of clause 2, 3, and 28-31, wherein the rubber layer comprises a cured rubber material.

Clause 33. The multi-layered structure of clauses 30-32, wherein an interface region is located at the interface between the rubber layer and the cap layer, wherein the interface region is substantially free of gas bubbles, or, if gas bubbles are present, the gas bubbles in the interface region have a total surface area of less than 20 percent of a total surface area of the interface region.

Clause 34. The multi-layered structure of clause 33, wherein, when gas bubbles are present, the total surface area of the gas bubbles in the interface region is less than 10 percent of the total surface area of the interface region.

Clause 35. The multi-layered structure of clause 33, wherein, when gas bubbles are present, the total surface area of the gas bubbles in the interface region is less than 4 percent of the total surface area of the interface region.

Clause 36. The multi-layered structure of clauses 30-35, wherein the rubber layer includes a rubber compound.

Clause 37. The multi-layered structure of clauses 2 and 3, wherein the uncured rubber compound includes a rubber compound.

Clause 38. The multi-layered structure of clauses 36-37, wherein the rubber compound is a natural rubber, a synthetic rubber, or a combination of both.

Clause 39. The multi-layered structure of clauses 36-37, wherein the rubber compound is natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber or any combination thereof.

Clause 40. The multi-layered structure of one of clauses 36-37, wherein the rubber compound is an isoprene rubber, a butyl rubber, a butadiene rubber, a styrene-butadiene rubber or any combination thereof.

Clause 41. The multi-layered structure of one of clauses 36-37, wherein the rubber compound is styrene-butadiene rubber.

Clause 42. The multi-layered structure of one of clauses 1 to 23, wherein the rubber compound is substantially free of silicone rubber.

Clause 43. The multi-layered structure of clause 1 to 42, wherein the core layer comprises a multi-layer polymeric material.

Clause 44. The multi-layered structure of clause 43, wherein the multi-layer polymeric material comprises alternating layers of a first thermoplastic material and a second thermoplastic material.

Clause 45. The multi-layered structure of clause 44, wherein each layer has an average thickness of about 0.1 microns to about 50 microns.

Clause 46. The multi-layered structure of clause 43-45, wherein the first thermoplastic material and the second thermoplastic material of the multi-layer polymeric material is formed of an elastomeric material.

Clause 47. The multi-layered structure of clause 46, wherein the elastomeric material includes one or more thermoplastic polyurethanes.

Clause 48. The multi-layered structure of clause 46, wherein the elastomeric material includes one or more ethylene-vinyl alcohol copolymers.

Clause 49. The multi-layered structure of clause 46, wherein at least one polymeric layers comprise a first thermoplastic polymeric layer and a second thermoplastic layer.

Clause 50. The multi-layered structure of clause 43, wherein the first thermoplastic material and the second thermoplastic material of the multi-layer polymeric material comprises one or more thermoplastic polyurethanes and the second thermoplastic layer comprises one or more thermoplastic ethylene-vinyl alcohol copolymers.

Clause 51. The multi-layered structure of clause 43, wherein the multi-layer polymeric material comprises alternating first layers comprising a polyester polyol-based TPU and second layers comprising an ethylene-vinyl alcohol copolymer.

Clause 52. The multi-layered structure of clauses 1 to 51, wherein a peel strength of the first cap layer to the core layer is about 1 Newton per millimeter to about 6 Newtons per millimeter.

Clause 53. The multi-layered structure of clauses 1 to 51, wherein the first cap layer further comprises a tackifier.

Clause 54. The multi-layered structure of clause 53, wherein the first cap layer comprises less than 40 weight percent of the tackifier.

Clause 55. The multi-layered structure of clause 1 to 29, wherein the first cap layer further comprises at least one of a vulcanization accelerator and a vulcanization aid.

Clause 56. The multi-layered structure of clause 55, wherein the vulcanization aid comprises zinc oxide, stearic acid, or a combination of both.

Clause 57. The multi-layered structure of clauses 1 to 56, further comprising a first release layer in direct contact with the second side of the first cap layer.

Clause 58. The multi-layered structure of clause 57, wherein at least one of the first release liner and the second release liner comprises a polyalkylene or a polyalkylene terephthalate.

Clause 59. An article comprising the multi-layered structure of clause 1-58.

Clause 60. The article of clause 59, wherein the article is a tire.

Clause 61. The article of clause 59, wherein article is an article of footwear, a component of footwear, apparel, a component of apparel, sporting equipment, or a component of sporting equipment, a personal protective article, a flexible flotation device, a rigid flotation device, a medical device, a prosthetic device, an orthopedic device, an accumulator, or article of furniture.

Clause 62. A method of manufacturing the multi-layered structure of one of clauses 1 to 58, wherein the method comprises:
  laminating or co-extruding the core layer with the first cap layer;
  the core layer having the first side and the second side; and
    the first cap layer having the cap layer first side and the cap layer second side, the first side of the first cap layer being adjacent the first side of the core layer.

Clause 63. The method of clause 62, further comprising laminating or co-extruding, in conjunction with the core layer and the first cap layer, a second cap layer having a second cap layer first side and a second cap layer second side, the first side being adjacent the second side of the core layer.

Clause 64. A method of manufacturing the multi-layered structure of one of clauses 1 to 58, comprising:
extruding the core layer, the core layer having the first side and the second side; and
laminating or transfer-coating the first cap layer onto the core layer, the first cap layer having the cap layer first side and the cap layer second side, the first side of the first cap layer being adjacent the first side of the core layer.

Clause 65. The method of clause 64, further comprising laminating or transfer-coating a second cap layer having a second cap layer first side and a second cap layer second side, onto the core layer, the second cap layer first side adjacent the second side of the core layer, wherein the laminating or transfer-coating of the second cap layer is after the laminating or transfer-coating of the first cap layer.

Clause 66. The method of clause 64, further comprising laminating or transfer-coating a second cap layer having a second cap layer first side and a second cap layer second side, onto the core layer, the second cap layer first side adjacent the second side of the core layer, wherein the laminating or transfer-coating of the second cap layer is substantially at the same time as the laminating of the first cap layer.

Clause 67. The method of clause 62-66, further comprising applying a curing package to the first cap layer or the second cap layer, wherein the curing package is a liquid curing package, a curing package dissolved in a solvent, or curing package suspended in a solvent, or any combination thereof, and the applying the curing package comprises spraying the curing package on the first cap layer or the second cap layer, dipping the first cap layer or the second cap layer in the curing package, or any combination thereof.

Clause 68. The method of clause 67, wherein the step of applying the curing package to the first cap layer or the second cap layer is conducted prior to laminating or transfer-coating the first cap layer or the second cap layer onto the core layer.

Clause 69. The method of clause 67, wherein the step of applying the curing package to the first cap layer or the second cap layer is conducted prior to laminating or transfer-coating the first cap layer or the second cap layer onto the core layer.

Clause 70. The method of clause 62-69, further comprising forming a tie layer between the first cap layer and the core layer, or between the second cap layer and the core layer, or both.

Clause 71. The method of clause 62-70, further comprising applying a release layer to the second side of the first cap layer, or to the second side of the second cap layer, or both.

Clause 72. A method of making a vulcanized article, comprising:
placing a cap layer of a multi-layered structure of any of clauses 1 to 58 in direct contact with a portion of uncured or partially cured rubber to form a layered article; and
exposing the layered article to a condition effective to vulcanize at least the portion of the uncured or partially cured rubber in direct contact with the cap layer to fully cure the uncured or partially cured rubber, producing the vulcanized article.

Clause 73. The method of clause 72, wherein the placing comprises placing the multi-layered structure and the uncured or partially cured rubber in a mold.

Clause 74. The method of clauses 72 or 73, wherein the exposing is conducted in the mold, and further comprising removing the vulcanized article from the mold after exposing the layered article.

Clause 75. A vulcanized article made by the method of one of clauses 72-74.

Clause 76. A vulcanized article comprising:
a multi-layered structure of any of clauses 1 to 58 bonded to a vulcanized rubber layer.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 percent to about 5 percent" should be interpreted to include not only the explicitly recited concentration of about 0.1 wt percent to about 5 wt percent, but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

What is claimed is:

1. A method of making a vulcanized article, the method comprising:
placing a first cap layer of a multi-layered structure in direct contact with a layer of uncured rubber to form a layered article, wherein the first cap layer has a cap layer first side and an opposing cap layer second side, and the cap layer second side is in direct contact with the layer of uncured rubber; and
exposing the layered article to a condition effective to vulcanize the layer of uncured cured rubber in direct contact with the cap layer, thereby fully curing the layer of uncured rubber into a layer of cured rubber and bonding the multi-layered structure to the layer of cured rubber, producing the vulcanized article;
wherein the multi-layered structure comprises the first cap layer and a core layer, wherein the cap layer first side is adjacent with a first side of the core layer, and the core layer has a gas transmission rate of about 0.05 to 0.1 cc/(m$^2$ 24 hr atm) for N$_2$ measured at 23 degrees Celsius and 0 percent relative humidity;
wherein the first cap layer comprises a cap layer material, the cap layer material comprising at least one polydiene polyol-based polyurethane, an uncured rubber compound, and a curing package;
the uncured rubber compound of the cap layer material includes less than 5 weight percent of volatile compounds, the volatile compounds are volatile compounds released from the uncured rubber compound when the uncured rubber compound is heated to a temperature of about 200 degrees Celsius, and the weight percent of volatile compounds in the uncured rubber compound is based on a total amount of the uncured rubber compound present in the cap layer material, the curing package of the cap layer material comprises a sulfur-based or peroxide-based curing agent; and the cap layer material comprises about 50 weight percent to about 80 weight percent of the at least one polydiene polyol-based polyurethane, about 25 weight percent to about 50 weight percent of the uncured rubber compound, and up to 2 weight percent of the curing package.

2. The method of claim 1, wherein the layer of uncured rubber comprises an uncured rubber compound including less than 5 weight percent of volatile compounds, wherein the volatile compounds are volatile compounds released from the uncured rubber compound when the uncured rubber compound is heated to a temperature of about 200 degrees Celsius.

3. The method of claim 1, wherein the at least one polydiene polyol-based polyurethane is a polydiene polyol-based thermoplastic polyurethane (TPU).

4. The method of claim 3, wherein the at least one polydiene polyol-based TPU: is a first polydiene polyol-based TPU having polyol-derived segments and isocyanate-derived segments, wherein about 1 to 90 percent on a molar basis of the polyol-derived segments in the first polydiene polyol-based TPU include one or more carbon-carbon double bonds; is a second polydiene polyol-based TPU having a tack strength of at least 1 Newton per millimeter and a melting point of about 70 to 150 degrees Celsius; or is a third polydiene polyol-based TPU having a tack strength of at least 1 Newton per millimeter and a melting point of about 70 to 150 degrees Celsius and has polyol-derived segments and isocyanate-derived segments, wherein about 1 to 90 percent on a molar basis of the polyol-derived segments in the first polydiene polyol-based TPU include one or more carbon-carbon double bonds.

5. The method of claim 3, wherein the polydiene polyol-based TPU includes polyol-derived segments, and wherein about 1 to up to 50 percent on a molar basis of the polyol-derived segments in the first polydiene polyol-based TPU include one or more carbon-carbon double bonds and greater than 50 percent on a molar basis of the polyol-derived segments do not include carbon-carbon double bonds.

6. The method of claim 3, wherein the polydiene polyol-based TPU includes polyol-derived segments, and wherein about 1 to up to 40 percent on a molar basis of the polyol-derived segments in the polydiene polyol-based TPU include one or more carbon-carbon double bonds and greater than 60 percent on a molar basis of the polyol-derived segments do not include carbon-carbon double bonds.

7. The method of claim 3, wherein the polydiene polyol-based TPU includes polyol-derived segments, and wherein about 1 to up to 30 percent on a molar basis of the polyol-derived segments in the first polydiene polyol-based TPU include one or more carbon-carbon double bonds and greater than 70 percent on a molar basis of the polyol-derived segments do not include carbon-carbon double bonds.

8. The method of claim 7, wherein the polyol-derived segments that do not include carbon-carbon double bonds comprise one or more of a polyester functional group and a polyether functional group.

9. The method of claim 1, wherein the curing package has an initiation temperature that is less than the melting temperature of the cap layer.

10. The method of claim 1, wherein the curing package includes a solvent that has an evaporation temperature less than the initiation temperature.

11. The method of claim 1, wherein the curing package includes a solvent that has the characteristic of being able to penetrate the cap layer without degrading the core layer.

12. The method of claim 11, wherein the solvent is selected from ethyl acetate, toluene, acetone, and combinations thereof.

13. The method of claim 1, wherein the uncured rubber compound is a natural rubber, a synthetic rubber, or a combination of both.

14. The method of claim 1, wherein the uncured rubber compound is natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber or any combination thereof.

15. The method of claim 1, wherein the uncured rubber compound is an isoprene rubber, a butyl rubber, a butadiene rubber, a styrene-butadiene rubber or any combination thereof.

16. The method of claim 1, wherein the uncured rubber compound is styrene-butadiene rubber.

17. The method of claim 1, wherein the uncured rubber compound is substantially free of silicone rubber.

18. A method of making a vulcanized article, the method comprising:

placing a first cap layer of a multi-layered structure in direct contact with a layer of uncured rubber to form a layered article, wherein the first cap layer has a cap layer first side and an opposing cap layer second side, and the cap layer second side is in direct contact with the layer of uncured rubber; and exposing the layered article to a condition effective to vulcanize the layer of uncured cured rubber in direct contact with the cap layer, thereby fully curing the layer of uncured rubber into a layer of cured rubber and bonding the multi-layered structure to the layer of cured rubber, producing the vulcanized article;

wherein the multi-layered structure comprises the first cap layer and a core layer, wherein the cap layer first side is adjacent with a first side of the core layer, and the core layer has a gas transmission rate of about 0.05 to 0.1 cc/(m$^2$ 24 hr atm) for $N_2$ measured at 23 degrees Celsius and 0 percent relative humidity;

wherein the first cap layer comprises a cap layer material, the cap layer material comprising at least one polyol-based polyurethane, an uncured rubber compound, and a curing package;

the uncured rubber compound of the cap layer material includes less than 5 weight percent of volatile compounds, the volatile compounds are volatile compounds released from the uncured rubber compound when the uncured rubber compound is heated to a temperature of about 200 degrees Celsius, and the weight percent of volatile compounds in the uncured rubber compound is based on a total amount of the uncured rubber compound present in the cap layer material, and the curing package of the cap layer material comprises a sulfur-based or peroxide-based curing agent.

19. The method of claim 18, wherein the layer of uncured rubber comprises an uncured rubber compound including less than 5 weight percent of volatile compounds, wherein the volatile compounds are volatile compounds released from the uncured rubber compound when the uncured rubber compound is heated to a temperature of about 200 degrees Celsius.

* * * * *

UNITED STATES PATENT AND TRADEMARK OFFICE
CERTIFICATE OF CORRECTION

| | |
|---|---|
| PATENT NO. | : 12,269,947 B2 |
| APPLICATION NO. | : 18/312171 |
| DATED | : April 8, 2025 |
| INVENTOR(S) | : Yihua Chang and Richard L. Watkins |

Page 1 of 1

It is certified that error appears in the above-identified patent and that said Letters Patent is hereby corrected as shown below:

In the Specification

• Under Column no. 11, Line no. 34 (Approx.), please replace "R," with --R1--.
• Under Column no. 18, Line no. 34 (Approx.), please replace "R," with --R1--.

In the Claims

• Under Column no. 45, Claim 5, Line no. 44, please replace "in the first polydiene" with --in the polydiene--.
• Under Column no. 45, Claim 7, Line no. 59, please replace "in the first polydiene" with --in the polydiene--.

Signed and Sealed this
Thirtieth Day of September, 2025

John A. Squires
*Director of the United States Patent and Trademark Office*